(12) United States Patent
Shima

(10) Patent No.: US 6,827,514 B1
(45) Date of Patent: Dec. 7, 2004

(54) PRINTER WITH BOOKBINDING FUNCTION FOR BINDING PRINTED MATTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 544 days.

(21) Appl. No.: 09/637,415

(22) Filed: Aug. 11, 2000

(30) Foreign Application Priority Data

Aug. 12, 1999 (JP) .......................................... 11-228363
Oct. 29, 1999 (JP) .......................................... 11-309564

(51) Int. Cl.⁷ .............................................. B41J 11/44
(52) U.S. Cl. ......................... 400/582; 400/61; 400/70; 400/76
(58) Field of Search .......................... 400/582, 61, 70, 400/76

(56) References Cited

U.S. PATENT DOCUMENTS

| 5,923,013 A | * 7/1999 | Suzuki et al. ............... 235/375 |
| 5,970,222 A | * 10/1999 | Gusmano et al. .......... 358/1.16 |
| 6,181,436 B1 | 1/2001 | Kurachi ..................... 358/1.15 |
| 6,285,461 B1 | 9/2001 | Fujii et al. ................. 358/1.18 |
| 2002/0018235 A1 | * 2/2002 | Ryan et al. ................. 358/1.15 |
| 2002/0078012 A1 | * 6/2002 | Ryan et al. ..................... 707/1 |
| 2002/0097407 A1 | * 7/2002 | Ryan et al. ................... 358/1.1 |

FOREIGN PATENT DOCUMENTS

| EP | 0 915 414 A2 | 5/1999 |
| EP | 0 933 692 A2 | 8/1999 |
| JP | 9-174956 | 7/1997 |
| JP | 10-301739 | 11/1998 |
| JP | 10-301900 | 11/1998 |

OTHER PUBLICATIONS

Machine Translation of JP 09–174956.*
European Search Report, Dated Sep. 11, 2002, 3 pages.
Patent Abstracts of Japan Publication No. 09174956A published Jul. 8, 1997 (1 page).
Notification of Reason for Refusal for patent application No. HEI 11 (1999) –309564 Draft Date Aug. 26, 2002 (English translation dated Nov. 19, 2002) (2 pages) Japanese document from which translation is derived (1 page).

* cited by examiner

Primary Examiner—Charles H. Nolan, Jr.
(74) Attorney, Agent, or Firm—Osha & May L.L.P.

(57) ABSTRACT

The present invention conducts printing by controlling the jobs previously input to the printer. The job for conducting printing by unifying a plurality of jobs reads the respective jobs previously input to the storage device and conducts printing on printing paper thereby. Further, the job for designating bookbinding processing such as binding printed matter with a staple performs bookbinding processing designated to printed matter to be output. Accordingly, after inputting individual jobs prepared with a variety of application software to the printer, the user may conduct printing by controlling such jobs.

5 Claims, 22 Drawing Sheets

FIG.4(a)

| JOB ID | SUB-JOB ID | IMAGE DATA | SUB-JOB ID | IMAGE DATA | SUB-JOB ID | IMAGE DATA | ... |

FIG.4(b)

| NW PROGRAM | JOB ID | SUB-JOB ID | SIMPLIFIED DATA | SUB-JOB ID | SIMPLIFIED DATA | SUB-JOB ID | SIMPLIFIED DATA | ... |

FIG.4(c)

| JOB ID | SUB-JOB ID | SIMPLIFIED DATA | SUB-JOB ID | SIMPLIFIED DATA | SUB-JOB ID | SIMPLIFIED DATA | ... |

FIG.5(a)

| JOB TYPE | JOB ID | SUB-JOB ID | SUB-JOB ID | JOB ID | JOB ID | SUB-JOB ID | ... |

FIG.5(b)

| JOB TYPE | BOOKBINDING DESIGNATIVE INFORMATION | JOB ID | SUB-JOB ID | SUB-JOB ID | JOB ID | JOB ID | SUB-JOB ID | ... |

| PAPER | NUMBER OF COPIES | ONE SIDE/ BOTH SIDES | | PAGE NUMBERS | STAPLE | PUNCH | ... |

INDENTATION

PRINTER WITH BOOKBINDING FUNCTION FOR BINDING PRINTED MATTER

BACKGROUND OF THE INVENTION

1. Field of the Invention

The present invention generally relates to technology of a printer and a print system including such a printer, and particularly to technology of controlling print jobs accumulated within the printer.

2. Description of the Related Art

In addition to the ordinary printing function, there are printers comprising a so-called finishing function for binding printed paper. This printer comprising the finishing function sends the paper printed with the print engine to the finishing processing mechanism and, after the finishing processing mechanism binds such paper with a the likes of a staple to obtain a bound document, outputs such document. Thereby, the user is able to obtain a bound document merely by giving printing instructions, including finishing, from the application program, and automate the stapling procedure or the like.

Meanwhile, the user properly uses application software appropriate for the intended usage. Particularly, in recent years, there are demands for preparing documents superior in attractiveness. For example, graphic software superior in processing graphic data is used for the front page, and word processor software is used for the text. Users are properly using dedicated software suitable for the intended usage.

Nevertheless, with the printer comprising the aforementioned conventional finishing function, it was not possible to bind a plurality of documents to make a single bound document since the finishing processing is designated per document. Thus, for example, when respectively preparing the front cover and text with separate application software, ultimately, the user had to manually bind the front cover and text after they were printed based on the respective application data.

SUMMARY OF THE INVENTION

The gist of the present invention is to enable the control of jobs previously input to the printer. This invention therefore controls previously input jobs by inputting new jobs to the printer. In addition, this invention controls previously input jobs by accepting job control-related operations from a user. The printer is thereby able to unify the plurality of previously input jobs and perform finishing processing to printed matter as necessary.

That is, the printer according to the present invention stores print data in a prescribed storage device based on the first print job data sent from a host device. This printer reads print data stored in the prescribed storage device in accordance with the second print job data sent from the host device and executes printing on a print recording medium.

The printer stores the generated print data in a prescribed storage device upon associating it with prescribed ID information. The printer reads specific print data among the stored print data in accordance with prescribed ID information contained in the second print job data. Generally, print data is image data in a raster format forming one page worth of the print recording medium, and prescribed ID information is associated with print data in page units.

The printer performs finishing processing based on prescribed bookbinding information when the second print job data contains prescribed bookbinding information related to finishing processing. This finishing processing, for example, may be stapling processing using staples or hole-punching processing using a punch.

The printer generates simplified data based on the print data, associates the ID information with the generated simplified data, and sends the simplified data associated with the ID information as job management data to the host device.

The host device according to the present invention stores job management data sent from the printer, displays simplified data containing the job management data, accepts interactive operations from the user, edits the ID information contained in the job management data, generates print job data containing the ID information in accordance with the editing results, and outputs this to the printer.

The printer according to the present invention stores print job data and associated information related to such print job data sent from the host device in a prescribed storage device. The printer displays the associated information on a prescribed display device, urges the user for instructions on the print job data, reads the print job data stored in the prescribed storage device in accordance with the instructions input by the user, and executes printing on a print recording medium.

The printer storing a plurality of print job data accepts designations from the user on print job data to be printed, and the printer thereby reads the designated print job data and executes printing. When the printer accepts designations from the user on print job data to be printed in a specific order, the printer reads the print job data in the designated order of printing and executes printing.

When the printer accepts instructions on finishing processing for at least two or more designated print data in its entirety, the printer performs finishing processing to the overall print data. Here, the printer serially adds page numbers to the aforementioned at least two or more designated print data in its entirety based on the instructions of such finishing processing.

In place of the setting information provided to the respective print job data, the printer executes printing based on the print job data in accordance with the newly accepted instructions from the user via the display device.

Furthermore, the term "means" used in this specification is not limited to merely a physical means, but also includes cases where the functions of such means are realized by software. Moreover, functions of a single means may be realized by two or more physical means, and functions of two or more means may be realized by a single physical means.

BRIEF DESCRIPTION OF THE DRAWINGS

FIG. 4 is a diagram showing an example of the output data of the job ID issuance unit;

FIG. 5 is a diagram for explaining an example of the job control data;

DESCRIPTION OF THE PREFERRED EMBODIMENTS

Embodiments of the present invention are now explained with reference to the relevant drawings.

[Embodiment 1]

Figure 1:
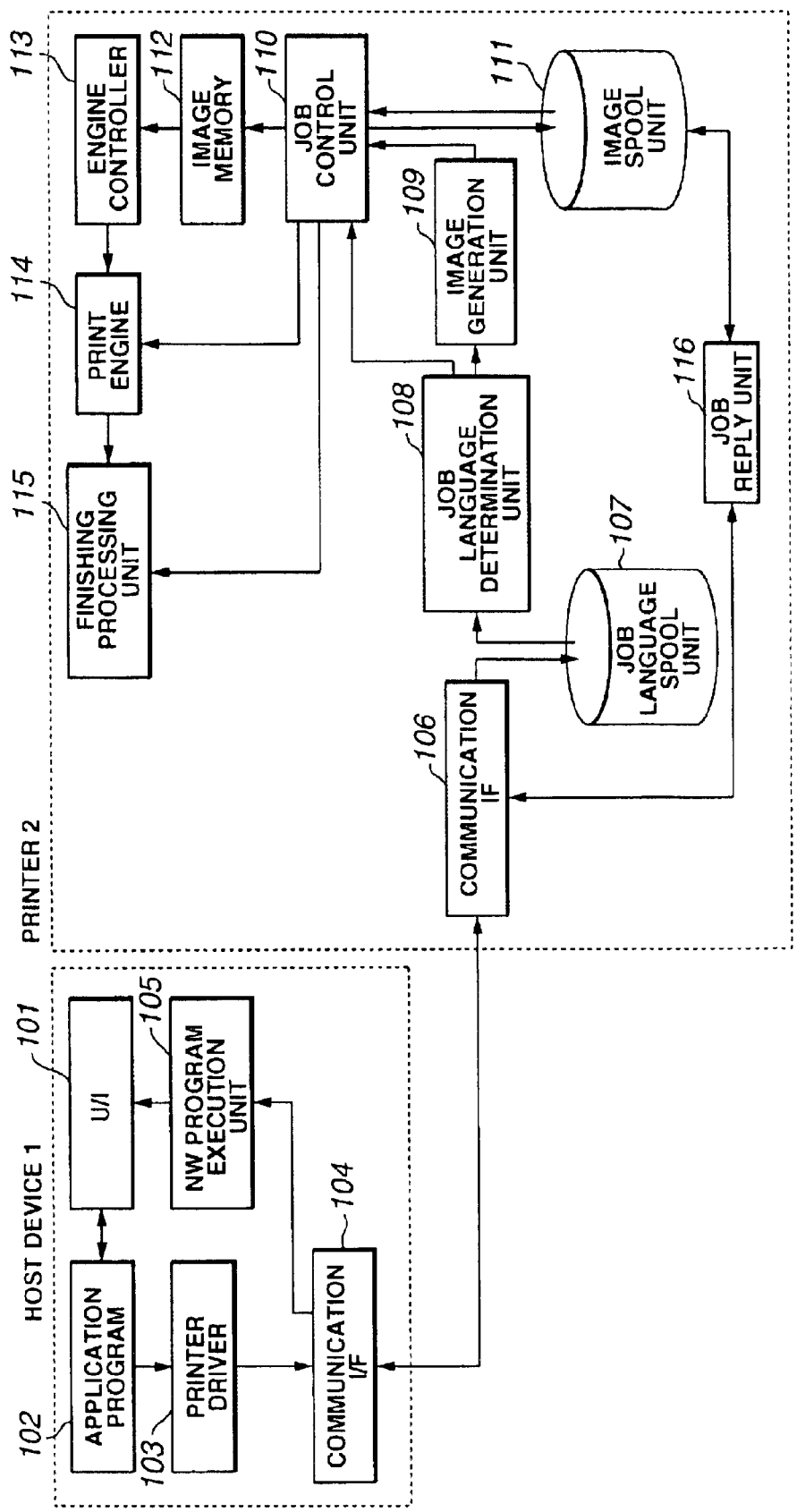
FIG. 1 is a block diagram showing the structure of the print system according to Embodiment 1.

FIG. 1 is a block diagram showing the structure of the print system according to the present embodiment. This print system is structured of a host device 1 and printer 2 connected via a network N such as the Ethernet. In FIG. 1, one representative host device 1 and printer 2 are respectively shown among a plurality thereof connected to the network N. The host device 1 may be typically replaced with a general use PC. The host device 1 realizes prescribed functions by executing prescribed programs and cooperating with prescribed hardware under the control of the operating system.

A user interface (represented as U/I in the drawings) 101 realizes the interactive operation with a user and is typically structured of a display, keyboard, mouse, device drivers thereof, upper browser programs, and so on.

An application program 102 typically corresponds to word processors for preparing texts and graphic tools for preparing diagrams. The application program 102 delivers the application data handled thereon to the printer driver 103 in accordance with the print instructions provided via the user interface 101.

The printer driver 103 calls a prescribed function and procedure based on the application data delivered from the application program 102, and generates print job data for the target printer. This print job data contains commands and data for generating image data in a raster format.

A communication interface (hereinafter referred to as "communication I/F") 104 is physically connected to the network N, and enables the network communication between the printer 2.

A network program execution unit 105 interprets and executes the job-editing program sent from the printer 2 via the network. As the job editing program, for example, used may be the Java language or the like. The network program execution unit 105 in this embodiment is capable of generating new print job data based on prescribed operational contents provided from the user in response to the job management data sent from the printer 2 together with the job-editing program. This print job data contains a job ID for specifying the previously generated image data. Details of this network program execution 105 are described later.

The structure of the printer 2 is now explained. The communication I/F 106 is compatible with the communication I/F 104, physically connected to the network N, and enables the network communication between the host device 1. A job language spool unit 107 temporarily accumulates print job data sent from the communication I/F 106 via the network N. The job language spool unit 107 is, for example, structured from the likes of a hard disk device, RAM, etc.

Figure 2A:
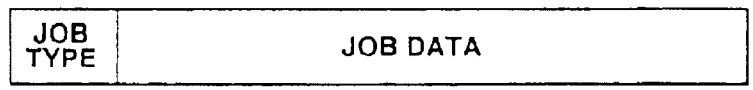
FIG. 2 is a diagram for explaining the structure of print job data.
Figure 2B:
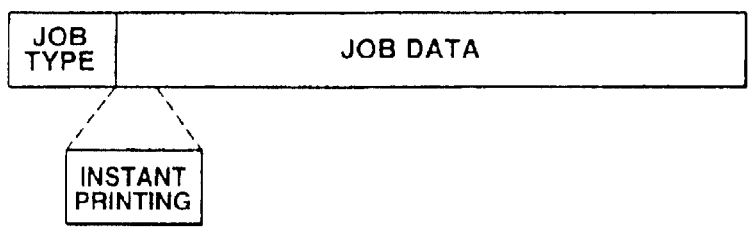

A job language distinction unit 108, for example, successively reads the print job data accumulated in the job language spool unit 107 and distinguishes the type thereof. FIG. 2 is a diagram for explaining the structure of the print job data. As shown in FIG. 2(*a*), print job data has a job type area showing the type of job and a job data area storing the contents of the job. As job types, there is print job data for controlling the job itself previously input to the printer, and there is print job data other than the above. In order to differentiate the two print job data, in this specification, the print job data for controlling the job itself is specifically referred to as job control data. The job data area is formed containing prescribed commands and data to be interpreted by the image generation unit 109 when it is an ordinary print job data. When it is job control data, the job data area is formed containing data for controlling the job. When judging that the print job data read from the job language spool unit 107 is not job control data, the job language distinction unit 108 outputs this to the image generation unit 109. Meanwhile, when judging that it is job control data, the job language distinction unit 10B outputs this to the job control unit 110 without going through the image generation unit 109.

Upon receiving print job data, the image generation unit 109 interprets this and generates image data in a raster format. The image generation unit 109 outputs the generated image data to the job control unit 110.

Based on the image data sent from the image generation unit 109, the job control unit 110 generates data simply representing such image data (hereinafter referred to as "simplified data"), and associates job IDs to the image data and simplified data, respectively. The job control unit 110 outputs the image data to the image spool unit 111 and further outputs the simplified data thereof to the communication I/F 106 in order to send such data to the host device 1. Upon receiving job control data, the job control unit 110 interprets such job control data and performs processing based on the interpretation results. Details of the job control unit 110 will be described later.

The image memory 112 temporarily stores image data sent from the job control unit 110. The engine controller 113 reads image data developed in the image memory 112 in accordance with synchronization signals sent from the print engine 114, and supplies this to the print engine 114. The engine controller 113, for example, is activated when one page worth of image data is developed in the image memory 112. The print engine 114, for example, is structured from the likes of a paper-feeding mechanism or print head, and conducts printing on a print recording medium such as paper. The print engine 114 may be selected in accordance with the type of printer; for example, laser printers, serial printers, and so on.

The finishing processing unit 115 performs finishing processing to the print recording medium delivered from the print engine 114. Finishing processing is conducted based on control orders sent from the job control unit 110. Finishing processing is processing performed to a print recording medium which as been printed on (i.e., printed matter) and, for example, may be the binding with a stapler mechanism or hole-punching with a punch mechanism.

Upon receiving a transfer request of job management data from the host device 1, the job reply unit 116 reads the job management data accumulated in the job spool unit 111, and sends this along with a network program for prescribed job editing to the host device 1 via communication I/Fs 106 and 104. In the host device having received this job management information, the network program execution unit 105 interprets and executes such job management information.

Figure 3:
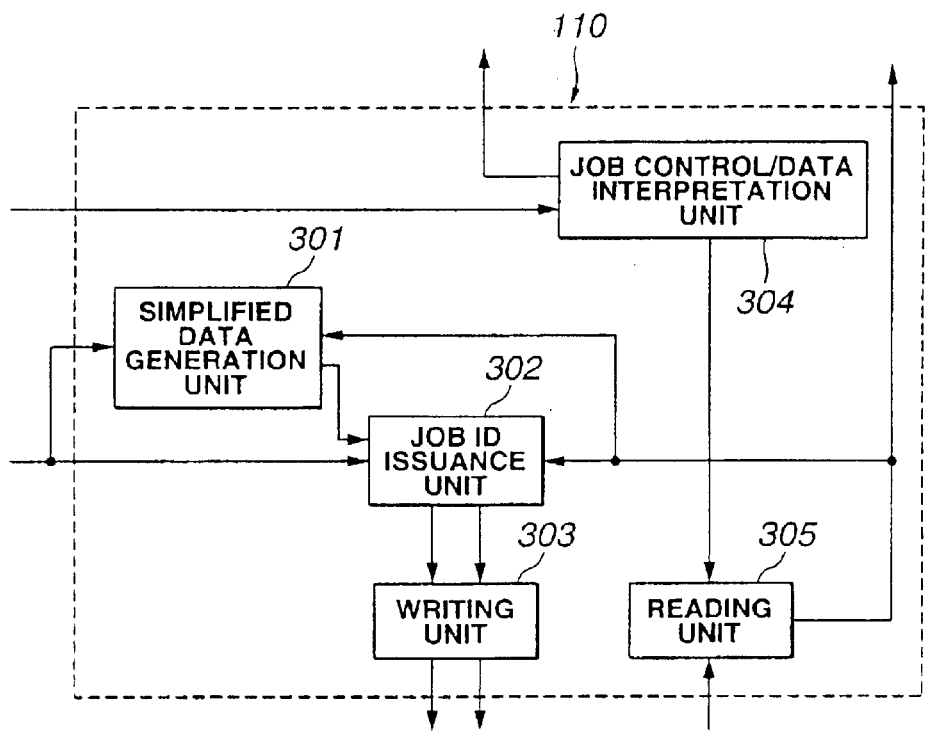
FIG. 3 is a block diagram showing the structure of the job controller of Embodiment 1.

FIG. 3 is a block diagram showing the structure of the job control unit 110 according to the present embodiment. In FIG. 3, the simplified data generation unit 301 generates simplified data by performing, for example, compression processing to the sent image data. In other words, it is preferable that the generated simplified data is of a smaller data size in comparison to the original image data. Image data may be sent from the image generation unit 109 or from the reading unit 305 described later. Each time image data in a raster format equivalent to one page worth of printing paper is sent, the simplified data generation unit 301 generates simplified data in correspondence therewith. In this embodiment, although the simplified data generation unit 301 generates simplified data based on the original image data, for example, such simplified data may be generated based on prescribed information contained in the print job data. As prescribed information, for example, used may be the host name, user name, file name, application name, and so on. That is, simplified data will suffice so as long as the user can recognize the original image data thereof.

The job ID issuance unit 302 issues job IDs for identifying the jobs input to the printer, and associates the identical ID with image data and the simplified data corresponding to such image data. Image data may be sent from the image generation unit 109 or from the reading unit 305. With respect to job IDs, there is a job ID for a single job in its entirety, and a sub-job ID for individual image data formed in page units. The job issuance unit 32 issues and associates a single job ID with a certain print job data (including job control data), and also issues and associates sub-job IDS with image data structuring the respective pages and the simplified data thereof. Here, when simply referred to as job ID, unless differentiation is particularly required, such job ID shall include both the job ID for the entire job and the sub-job ID.

FIG. 4 is a diagram showing an example of output data of the job ID issuance unit 302. In other words, the job ID issuance unit 302 outputs to the writing unit 303 data shown in FIG. 4(a) and (b). The writing unit 303 associates the job ID with image data and writes this in the image spool unit 111 such that the reading unit 305 is able to read image data in accordance with the job ID. The writing unit 303, for example, writes an image data file with the job ID as the file name. Data as shown in FIG. 4(b) sent to the host device 2, for example, is spooled in the likes of a hard disk device managed by the host device 2.

The job control data interpretation unit 304 interprets the job control data sent from the job language distinction unit 108. Job control data contains one or more job IDs, and may further contain information for designating finishing processing and the like as required (bookbinding designative information). FIG. 5 is a diagram explaining an example of job control data. Here, FIG. 5(a) shows an example of job control data structured from job IDs and sub-job IDs. The job control data interpretation unit 304 notifies the reading unit 305 of the job IDs successively extracted from the top position of the job control data. The reading unit 305 reads image data stored in the image spool unit 111 based on the notified job ID. The reading unit 305 outputs the read image to the image memory 112 as well as to the simplified data generation unit 301 and job ID issuance unit 302. Similarly, a job ID is provided to image data output from the reading unit 305, and stored in the image spool unit 111. Meanwhile, FIG. 5(b) shows an example of job control data containing bookbinding designative information. Included in the "bookbinding designative information" are, for example, "area for number of copies" showing the number of copies to be printed, "area for one side/both sides" showing whether printing is to be conducted on one side only or on both sides, "indentation area" for showing the indentation state, "area for addition of page numbers" for showing whether to add page numbers, "staple area" for showing whether to staple the printed matter, and "punch area" for showing whether to punch the printed matter. The job control data interpretation unit 304 notifies the units corresponding to the designated contents in order to perform the processing designated in the respective areas. For example, when the "staple area" shows "staple documents, " this is notified to the finishing processing unit 115.

Figure 6:
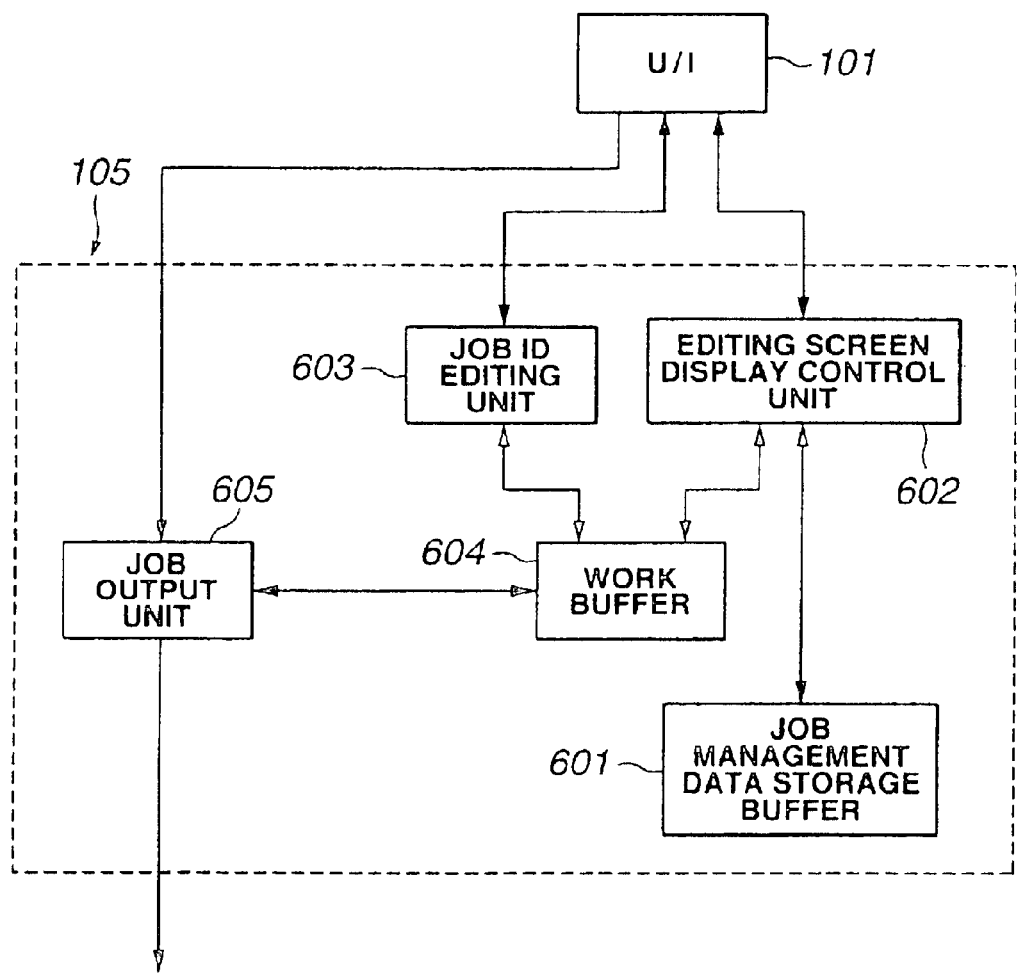
FIG. 6 is a block diagram showing the functional structure realized by the network program execution unit executing the job editing program of Embodiment 1.
Figure 7:
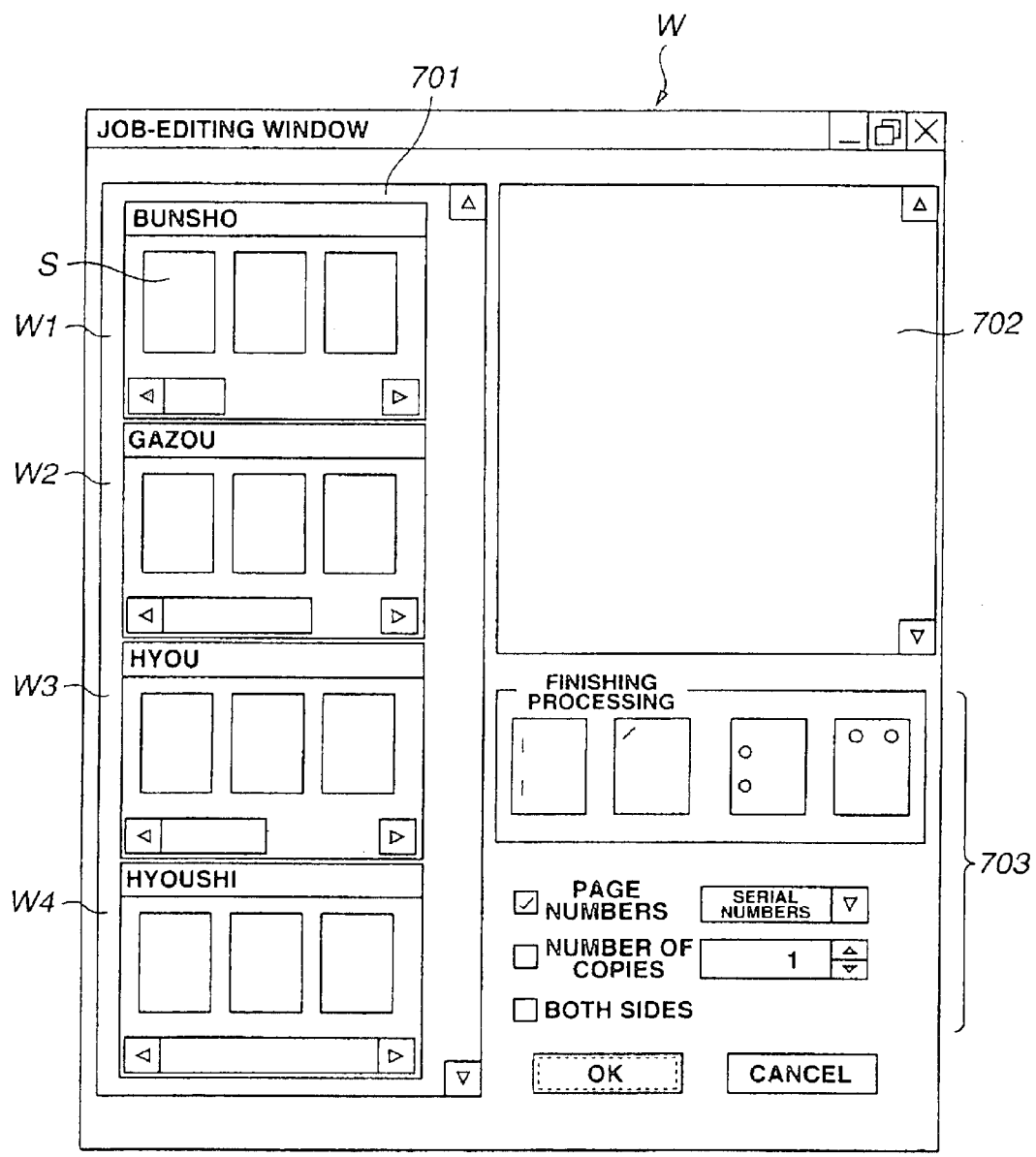
FIG. 7 is a diagram showing an example of a job-editing window displayed on the user interface.

FIG. 6 is a block diagram for explaining the functions realized by the network program execution unit 105 of this embodiment executing a job-editing program. The job management data storage buffer 601 stores job management data sent together with the job-editing program. The job-editing program is formed of a job ID and simplified data. When job-editing instructions are provided via the user interface 101, the editing screen display control unit 602 reads job management data stored in the job management data storage buffer 601 and, as shown in FIG. 7, displays on the user interface 101, for example, the job-editing window W. In FIG. 7, the job-editing window W has a job list area 701, job preparation area 702, and bookbinding designative area 703. The job list area 701 is for displaying job management data stored in the job management data storage buffer 601 and, in this example, is shown as sub-windows W1~W4. Simplified data contained in the job management data is displayed as a so-called thumbnail S in the respective sub-windows W1~W4. This thumbnail S represents the print image in page units. The job preparation area 702 is an area to which the print object thumbnail should be displayed, and corresponds to the contents of the work buffer 604. In the initial state, the as contents of the work buffer 604 are null, nothing is displayed. The bookbinding designative area 703 is for designating the bookbinding designative information and, in this example, is structured to allow the designation or selection of "staple," "punch," "page number addition," "number of copies to be printed," and "screen," respectively.

Figure 8:
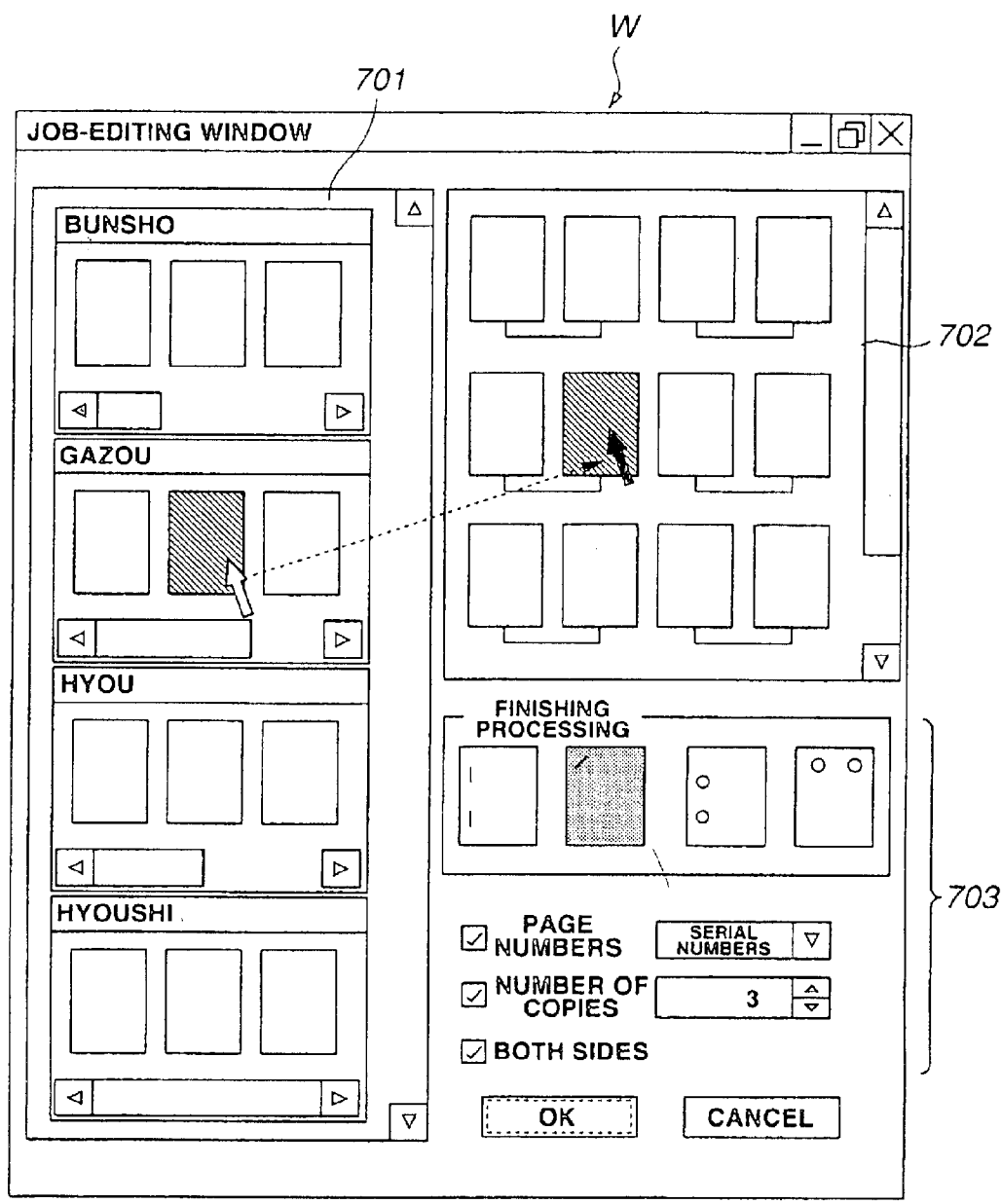
FIG. 8 is a diagram showing an example of a job-editing window displayed on the user interface.

Referring back to FIG. 6, the job-editing unit 603 prepares and edits jobs based on the operational contents provided via the user interface 102. In other words, the job-editing unit 603 edits the contents of the work buffer 604 based on the operational contents thereof. The work buffer 604 stores the contents of the job ID and bookbinding designative information during the editing procedures, and such contents are read by the editing window display control unit 602. FIG. 8 is a diagram showing an example of the job-editing window during editing procedures. FIG. 8 shows a situation where the user is moving the thumbnail from the job list area to the job preparation area with the drag and drop operation. This screen also shows that the stapling is designated as the finishing processing, serial numbers are designated as the indication of page numbers, three copies are designated for printing, and both sides are designated as the printing mode. When the user wishes to change the page printing order, he/she conducts the drag and drop operation within the job preparation area and changes the order of thumbnails. The job-editing unit 603 changes the contents of the work buffer 604 in accordance with the operational contents thereof. The job output unit 605 prepares print job data based on the contents stored in the work buffer 604 upon being provided with instructions on the termination of editing from the user interface 101, and outputs this to the communication I/F 104. That is, the job 605 outputs print job data as shown in FIG. 5.

Figure 9:
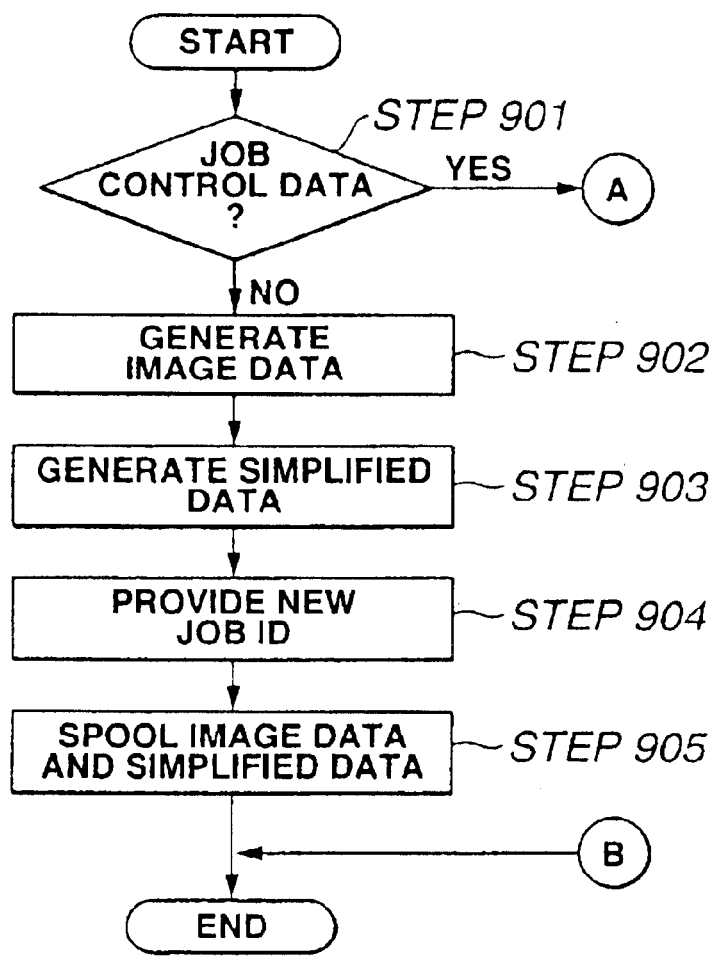
FIG. 9 is a flowchart for explaining the schematic operation of the printer of Embodiment 1.

FIG. 9 is a flowchart for explaining the schematic operation of the printer 2 according to the present embodiment. Foremost, when print job data is spooled to the job language spool unit 107, the printer 2 reads this print job data and judges whether such data is job control data (STEP 901). When the printer 2 judges that it is not job control data, it performs the processing of STEP 902~STEP 905, and when the printer 2 judges that it is job control data, it performs the processing steps shown in FIG. 10.

When the printer 2 judges that it is not job control data, it generates image data based on the job data text (STEP 902). The printer 2 generates simplified data based on one page worth of image data (STEP 903), and provides job IDs to the image data and its simplified data (STEP 904). Then, the printer 2 spools the image data and its simplified data with job IDs to the image spool unit 111 (STEP 905).

Figure 10:
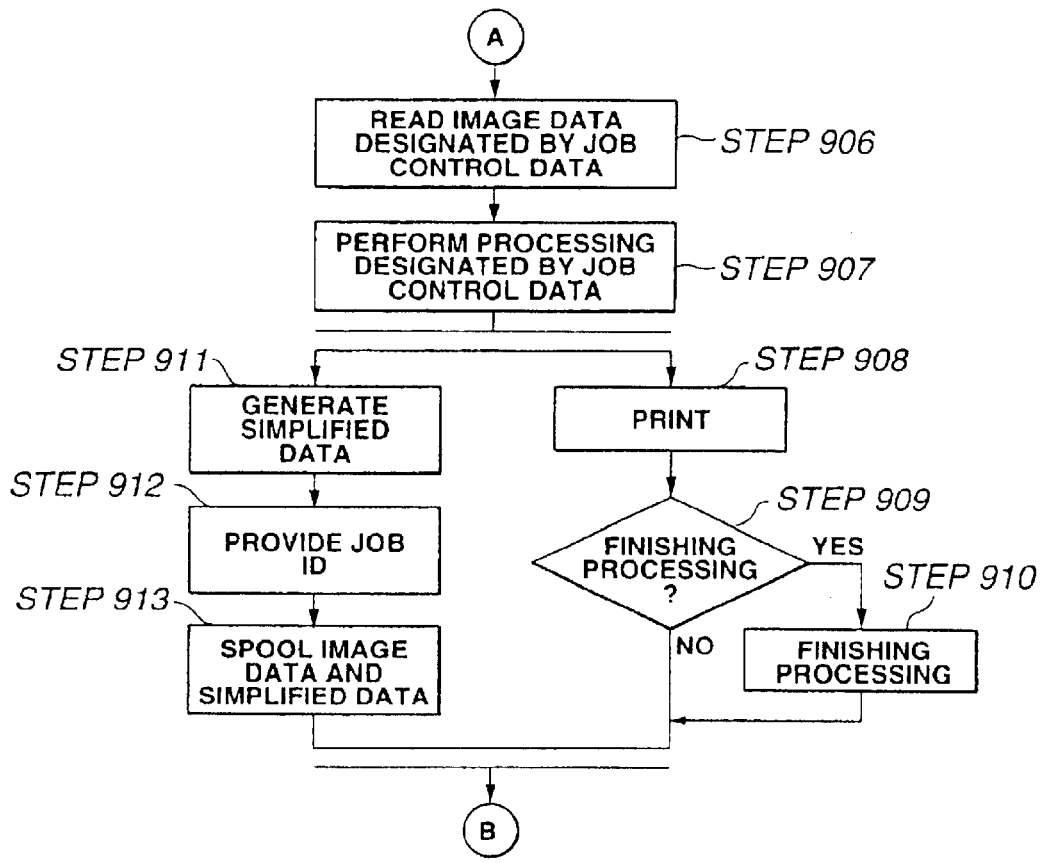
FIG. 10 is a flowchart for explaining the schematic operation of the printer of Embodiment 1.

Meanwhile, at STEP 901, when the printer 2 judges that it is job control data, it interprets the job control data and then reads the image data from the image spool unit 111 in accordance with the job ID (STEP 906 of FIG. 10). The printer 2 performs the processing designated by the job control data such as trimming the read image data (STEP 907). Here, when a bookbinding designation is provided to the job control data, instructions are given to the respective units in accordance with the designated contents thereof. When the printer 2 reads the image data, it performs print processing (STEP 908~STEP 910) and job registration processing (STEP 911~STEP 913).

In other words, the printer 2 supplies the read image data to the print engine 11, and executes printing on a print recording medium (STEP 908). Thereafter, if instructions of finishing processing are given to the job control data (STEP 909; YES), the printer 2 performs finishing processing to the printed paper (STEP 910). The printer 2 further performs job registration processing in parallel with the aforementioned print execution processing. As the steps of job registration processing are the same as aforementioned STEP 903~STEP 905, the explanation thereof is omitted.

Figure 11:
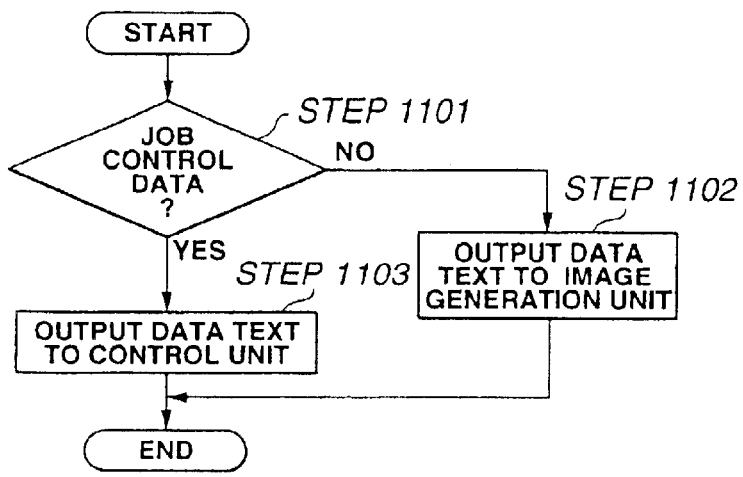
FIG. 11 is a flowchart for explaining the operation of the job language distinction unit of Embodiment 1.

FIG. 11 is a flowchart for explaining the operation of the job language distinction unit 108 according to the present embodiment. In FIG. 11, the, job language distinction unit 108 reads the print job data spooled to the job language spool unit 107, and distinguishes the type thereof (STEP 1101). When the job language distinction unit 108 judges that it is not job control data as a result thereof, it outputs the job data text to the image generation unit 109 (STEP 1102). And when the job language distinction unit 108 judges that it is job control data, it outputs the job data text to the job control unit 110 without going through the image generation unit 109 (STEP 1103).

Figure 12:
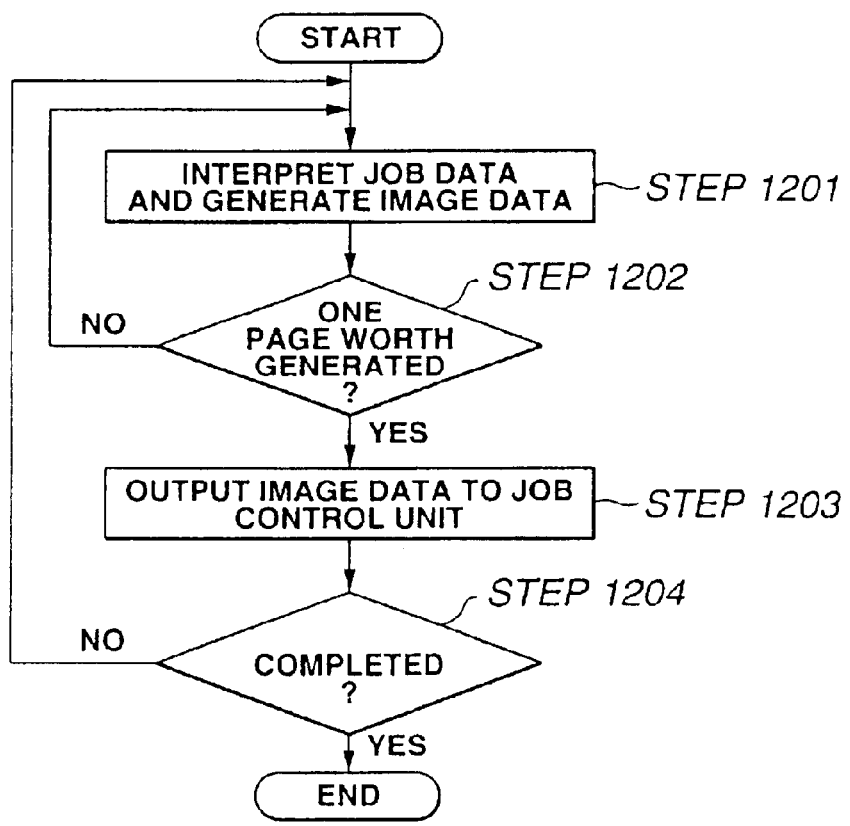
FIG. 12 is a flowchart for explaining the operation of the image generation unit of Embodiment 1.

FIG. 12 is a flowchart for explaining the operation of the image generation unit 109 according to the present embodiment. In FIG. 12, the image generation unit 109 interprets the job data text to be input, generates image data in a raster format and, for example, develops this to the work buffer (STEP 1201). When the image generation unit 109 generates one page worth of image data (STEP 1202), it outputs the generated image data to the job control unit 110 (STEP 1203). The image generation unit 109 repeats the aforementioned processing steps until the interpretation for all job data is completed (STEP 1204).

Figure 13:
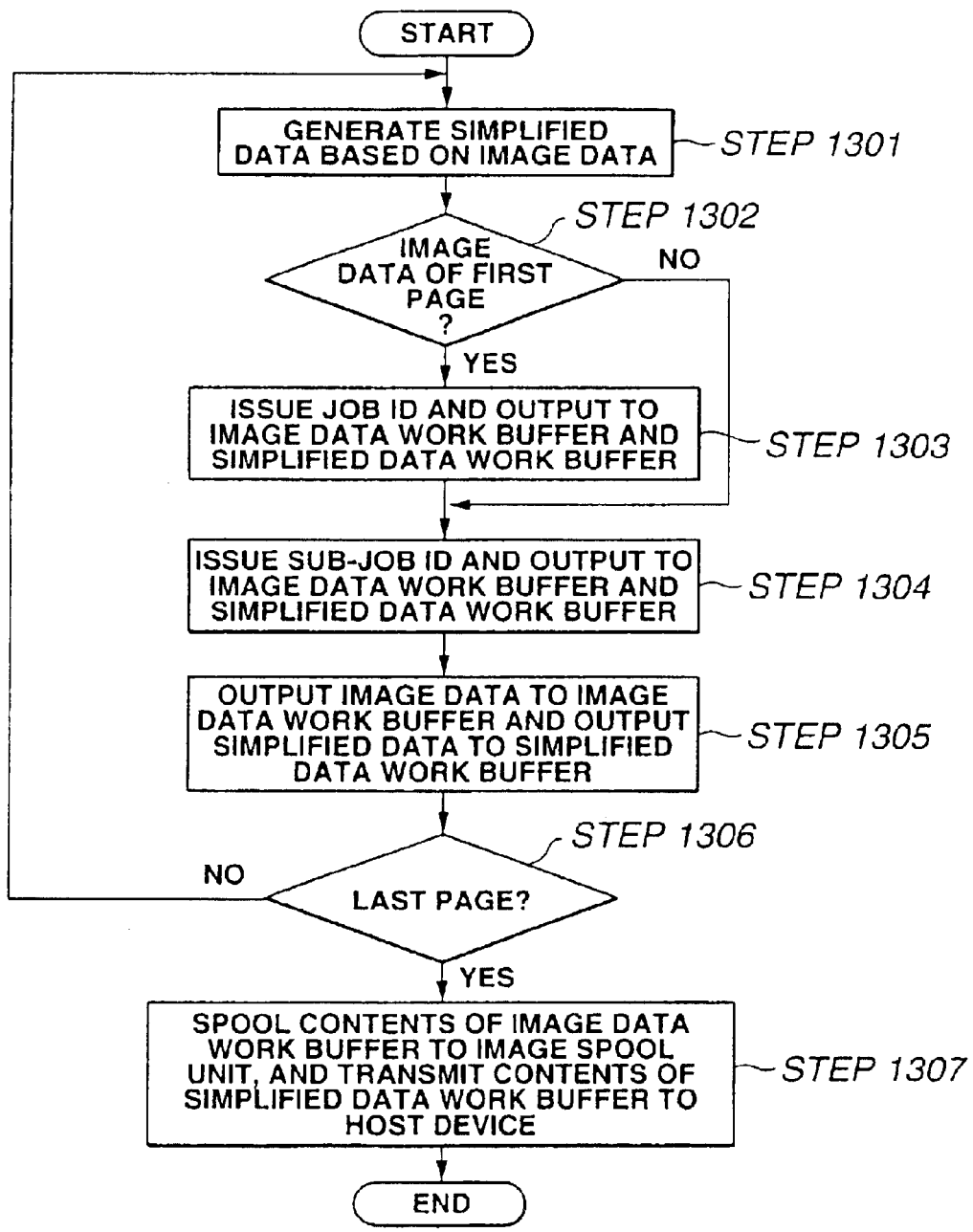
FIG. 13 is a flowchart for explaining the operation of the job controller of Embodiment 1.
Figure 14:
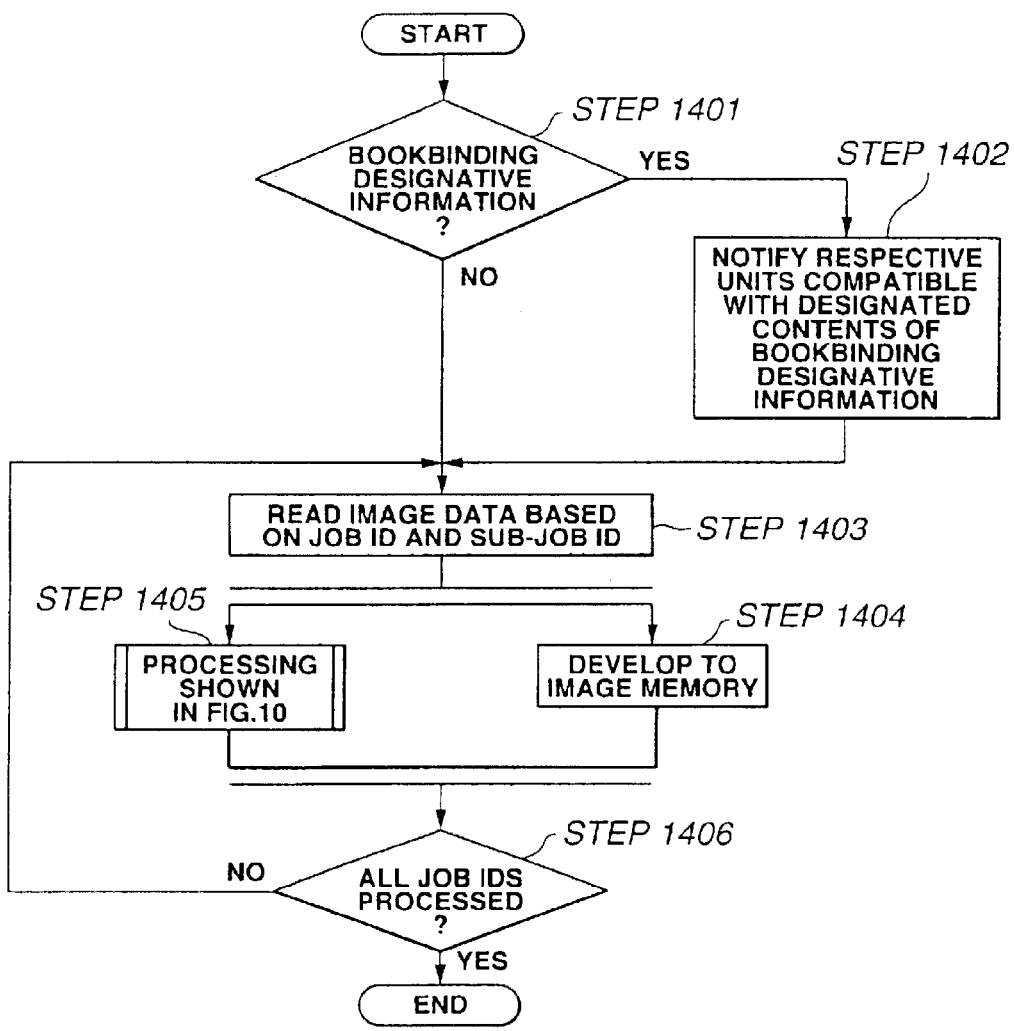
FIG. 14 is a flowchart for explaining the operation of the job controller 110 of Embodiment 1.

FIGS. 13 and 14 are flowcharts for explaining the operation of the job control unit 110 according to the present embodiment. Specifically, FIG. 13 is a flowchart for explaining the operation upon receiving image data from the image generation unit 109, and FIG. 14 is a flowchart for explaining the operation upon receiving job control data from the job language distinction unit 108.

Foremost, in FIG. 13, the job control unit 110 generates simplified data based on the input image data (STEP 1301). Next, the job control unit 110 judges whether such image data is the image data of the top page (STEP 1302). And when it is judged to be the image data of the top page, the job control unit 110 issues a job ID, and outputs this to the image data work buffer and simplified data work buffer, respectively (STEP 1303). The job control unit 110 thereafter issues a sub-job ID and, similarly, outputs this to the image data work buffer and simplified data work buffer, respectively (STEP 1304). Further, when it is judged as image data of page 2 or onward at STEP 1302, the processing of STEP 1304 is conducted without performing the processing of STEP 1303. The job control unit 110 outputs image data to the image data work buffer and further outputs simplified data to the simplified data work buffer (STEP 1305). When the job control unit 110 judges that it is the last page (STEP 1305; YES), it outputs the contents of the image data work buffer to the image spool unit 111 and transmits the contents of the simplified data work buffer to the host device 1 (STEP 1307).

Meanwhile, upon receiving job control data, the job control unit 110 judges whether bookbinding designative information is contained in such job control data (STEP 1401 of FIG. 14). When it is judges as including the bookbinding designative information, the job control unit notifies the respective units compatible with such designated contents (STEP 1402). Upon receiving this notification, the respective units perform processing in accordance with such designated contents. For example, when "staple documents" is designated, the finishing processing unit 115, after the printing is completed, properly arranges the papers in the tray and binds them by stapling such papers. The job control unit 110 reads image data from the image spool unit 111 based on the job ID and sub-job ID contained in the job control data (STEP 1403). The job control unit 110 develops the read image data to the image memory 112 so as to supply such read image data to the print engine 114 (STEP 1404). The job control unit 110 further performs processing shown in FIG. 10 based on the read image data so as to register the job control data as a new job (STEP 1405).

Figure 15:
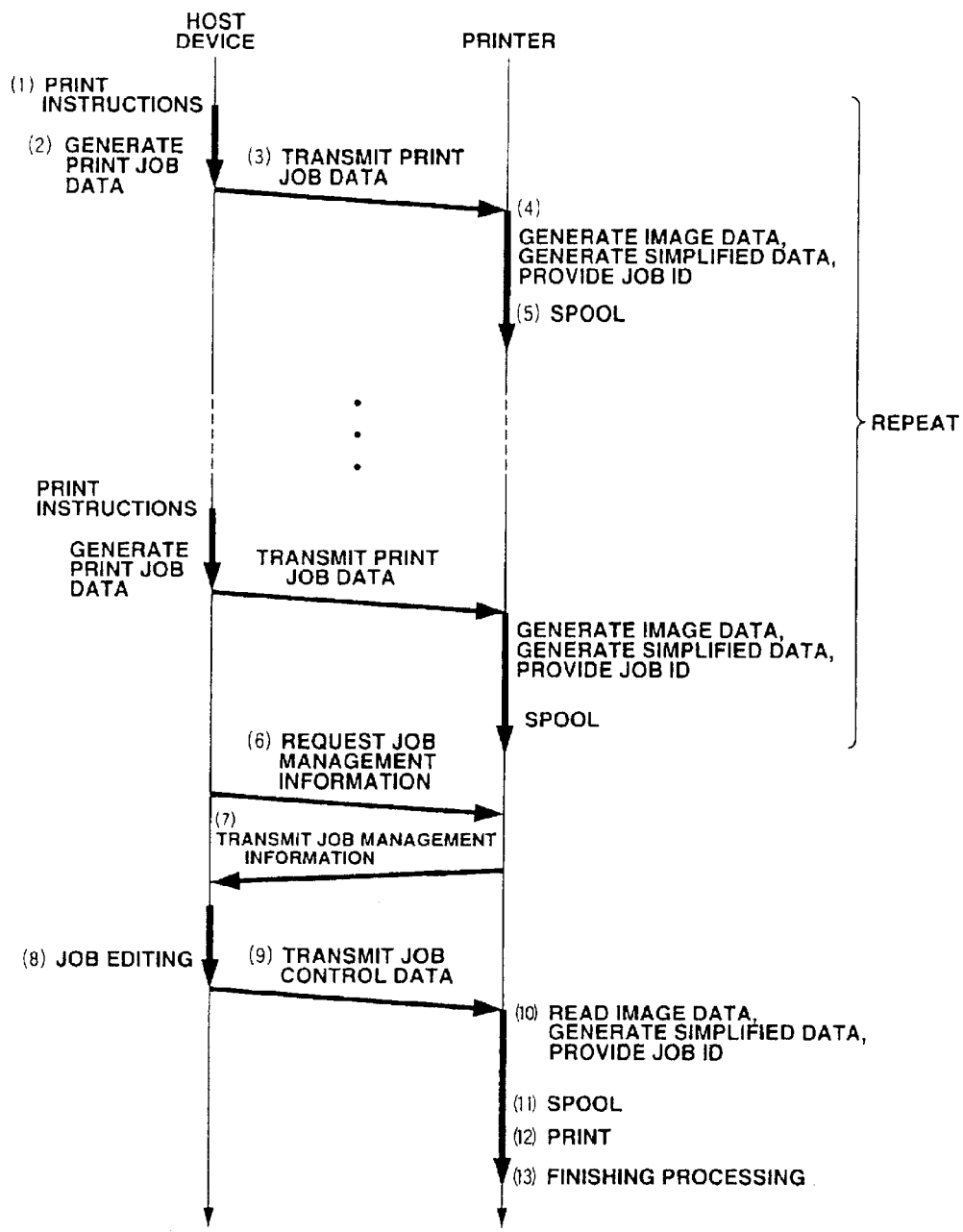
FIG. 15 is a diagram for explaining an operational example of the print system of Embodiment 1.

FIG. 15 is a diagram for explaining an operational example of the print system according to the present embodiment. Described below is an example of collectively printing four types of documents; namely, "BUNSHO" prepared with word processor software, "GAZOU" prepared with graphics software, "HYOU" prepared with chart/calculation software, and "HYOUSHI" prepared with other graphics software. Foremost, when a job generation instruction is given by a user from the first application program 102 (FIG. 15; (1)), the printer driver 103 generates print job data (FIG. 15; (2)), and transmits this to the printer 2 (FIG. 15; (3)). The printer 2 generates image data based on print job data, generates simplified data based on this image data, and thereafter provides the same ID number to the generated image data and simplified data (FIG. 15; (4)). The printer 2 stores the image data and simplified data in the image spool unit 111 (FIG. 15; (5)). Thereby, the job management data to the first print job data is spooled and stored. The user repeats the aforementioned processing as necessary. Next, when job editing instructions are provided from the user interface 101 of the host device 1, the host device 1 makes a request to the printer for job management information (FIG. 15; (6)). The printer 2 replies to this by transmitting a job-editing program as well as job management data to the host device 1 (FIG. 15; (7)). When the host device 1 receives the above, it executes the job-editing program, displays the job-editing window, and accepts job-editing operations (FIG. 15; (8)). When job editing is completed and instructions to that effect are given, the host device 1 transmits the edited contents to the printer 2 as job control data (FIG. 15; (9)). When the printer 2 receives the job control data, it generates simplified data by reading the image data in accordance with the contents thereof, and similarly provides a job ID thereto (FIG. 15; (10)). The printer 2 re-stores the image data in accordance with the job control data in the image spool unit 111, and stores the simplified data thereof in the image spool unit 111 as well (FIG. 15; (11)). The printer 2 supplies the read image data to the print engine 114, executes printing (FIG. 15; (12)) and, when finishing processing is designated, performs finishing processing (FIG. 15; (13)).

According to the present embodiment as described above, it is possible to easily obtain a single bound document based on a plurality of application data. Further, according to this embodiment, jobs may be temporarily accumulated on the printer side and, in accordance with the request from the host device, job management data showing such job may be transmitted to the host device. Thus, the jobs may be operated on the host side. Particularly, as transmissions from the printer to the host device are made in a format of job IDs and simplified data, and transmissions from the host device to the printer are made only with job IDs, the communication load may be lightened. Moreover, according to the present embodiment, it is extremely efficient as job management data is transmitted from the printer to the host device 1 only when necessary.

[Embodiment 2]

This embodiment is characterized in that the printer 2 transmits job management data to the host device 1 each time print job data is input. Moreover, in this embodiment, a program is not dynamically installed and executed with a network program as in Embodiment 1, but rather executed with a program priorly installed in the host device.

Figure 16:
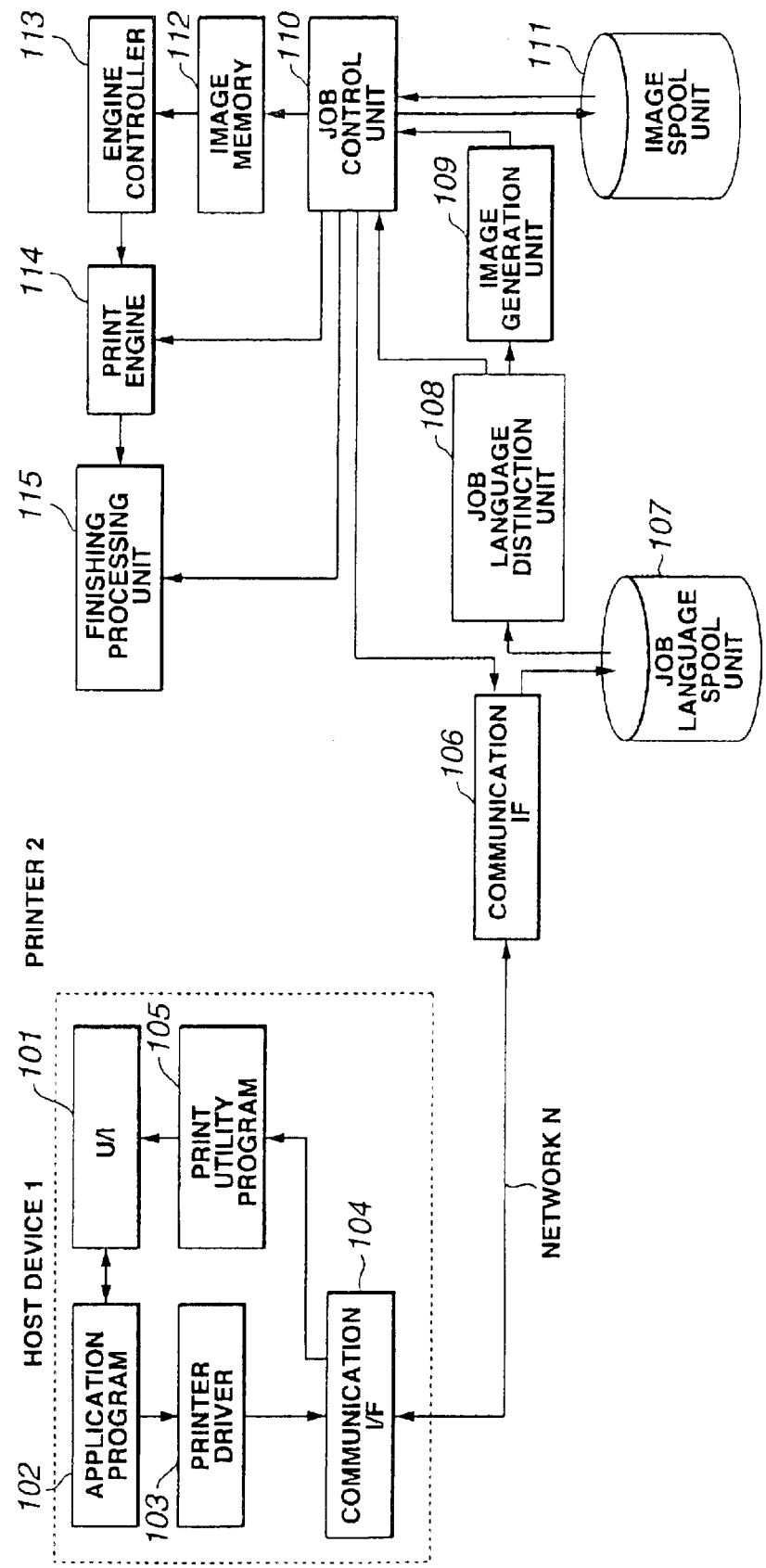
FIG. 16 is a block diagram showing the structure of the print system according to Embodiment 2.

FIG. 16 is a block diagram showing the structure of the print system according to the present embodiment. In FIG. 16, units identical to those described in Embodiment 1 are given the same reference numerals.

The print utility program 105 provides various services related to printing. The print utility program 105 in this embodiment is capable of generating new print job data based on prescribed operational contents provided by the user in response to the job management data sent from the printer 2. This print job data contains job IDs for specifying previously generated image data. The print utility program 105 does not have to be structured separately from the printer driver 103, and may be formed to be a part of such printer driver 103.

When a job ID is added to the image data and simplified data, the job control unit 110 outputs image data to the job spool unit 111, and simplified data to the communication I/F 106 so as to transmit such simplified data to the host device 1.

Figure 17:
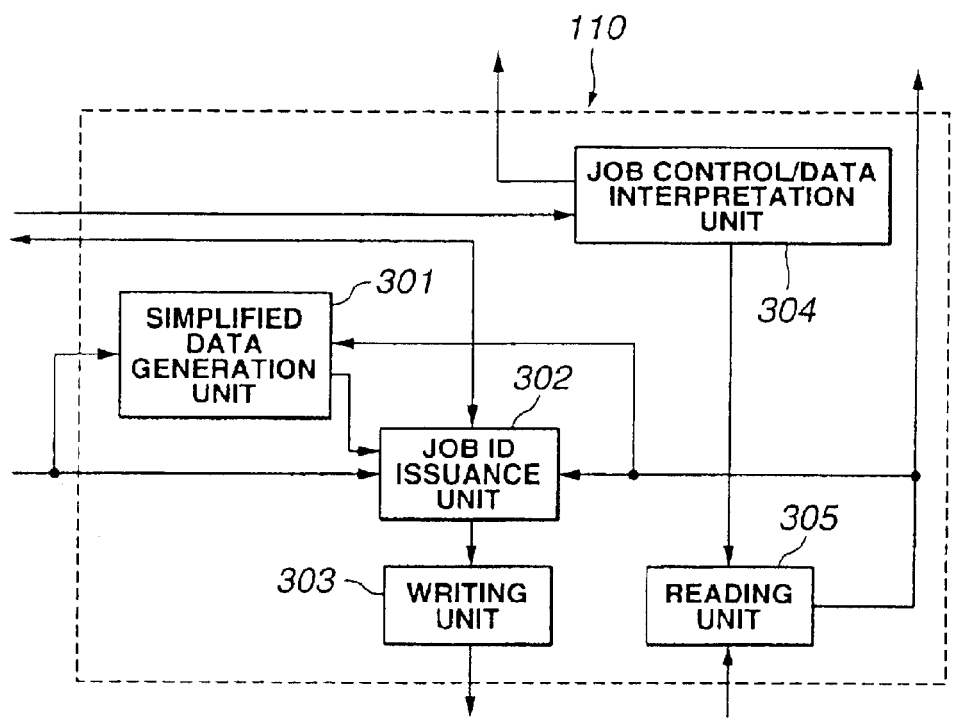
FIG. 17 is a block diagram showing the structure of the job controller of Embodiment 2.

FIG. 17 is a block diagram showing the structure of the job control unit 110 according to the present embodiment. In FIG. 17, the simplified data generation unit 301 generates simplified data by performing, for example, compression processing to the sent image data. In other words, it is preferable that the generated simplified data is of a smaller data size in comparison to the original image data. Image data may be sent from the image generation unit 109 or from the reading unit 305 described later. Each time image data in a raster format for one page worth of printing paper is sent, the simplified data generation unit 301 generates simplified data corresponding thereto.

The job ID issuance unit 302 issues job IDs for identifying the jobs input to the printer, and associates the identical ID with image data and the simplified data corresponding to such image data. Image data may be sent from the image generation unit 109 or from the reading unit 305. With respect to job IDs, there is a job ID for a single job in its entirety, and a sub-job ID for individual image data formed in page units. The job issuance unit 32 issues and associates a single job ID with a certain print job data (including job control data), and also issues and associates sub-job IDs with image data structuring the respective pages and the simplified data thereof.

Figure 18:
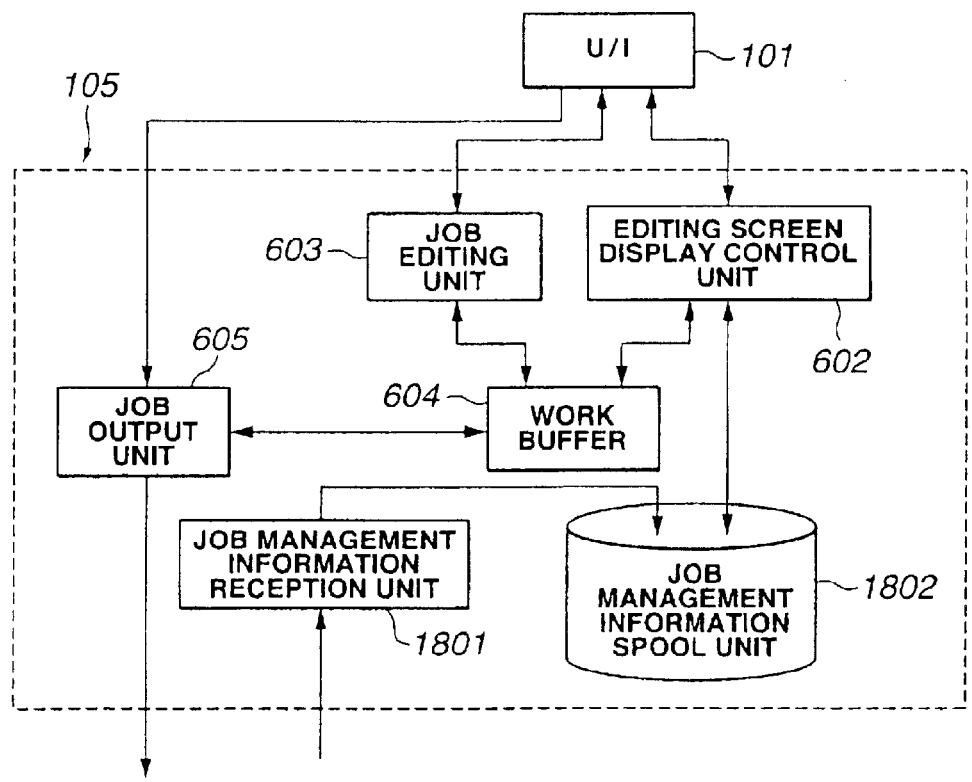
FIG. 18 is a block diagram showing the functional structure of the print utility program of Embodiment 2.

FIG. 18 is a block diagram showing the functional structure of the print utility program 105 according to the present embodiment. Upon receiving data (job management data) shown in FIG. 4(b) via the communication I/F 104, the job management data reception unit 1801 outputs this to the job management data spool unit 1802. Upon being provided with job-editing instructions via the user interface 101, the editing screen display control unit 602 reads the job management data stored in the job management data spool unit 1802, and displays a job-editing window W as shown in FIG. 7 on the user interface 101. Referring back to FIG. 6, the job-editing unit 603 prepares and edits jobs based on the operational contents provided via the user interface 102. In other words, the job-editing unit 603 edits the contents of the work buffer 604 based on the operational contents thereof. The work buffer 604 stores the contents of the job ID and bookbinding designative information during the editing procedures, and such contents are read by the editing window display control unit 602. The job-editing procedures are the same as Embodiment 1. The job-editing unit 603 changes the contents of the work buffer 604 in accordance with the operational contents thereof. The job output unit 605 prepares print job data based on the contents stored in the work buffer 604 upon being provided with instructions on the termination of editing from the user interface 101, and outputs this to the communication I/F 104. That is, the job 605 outputs print job data as shown in FIG. 5.

Figure 19:
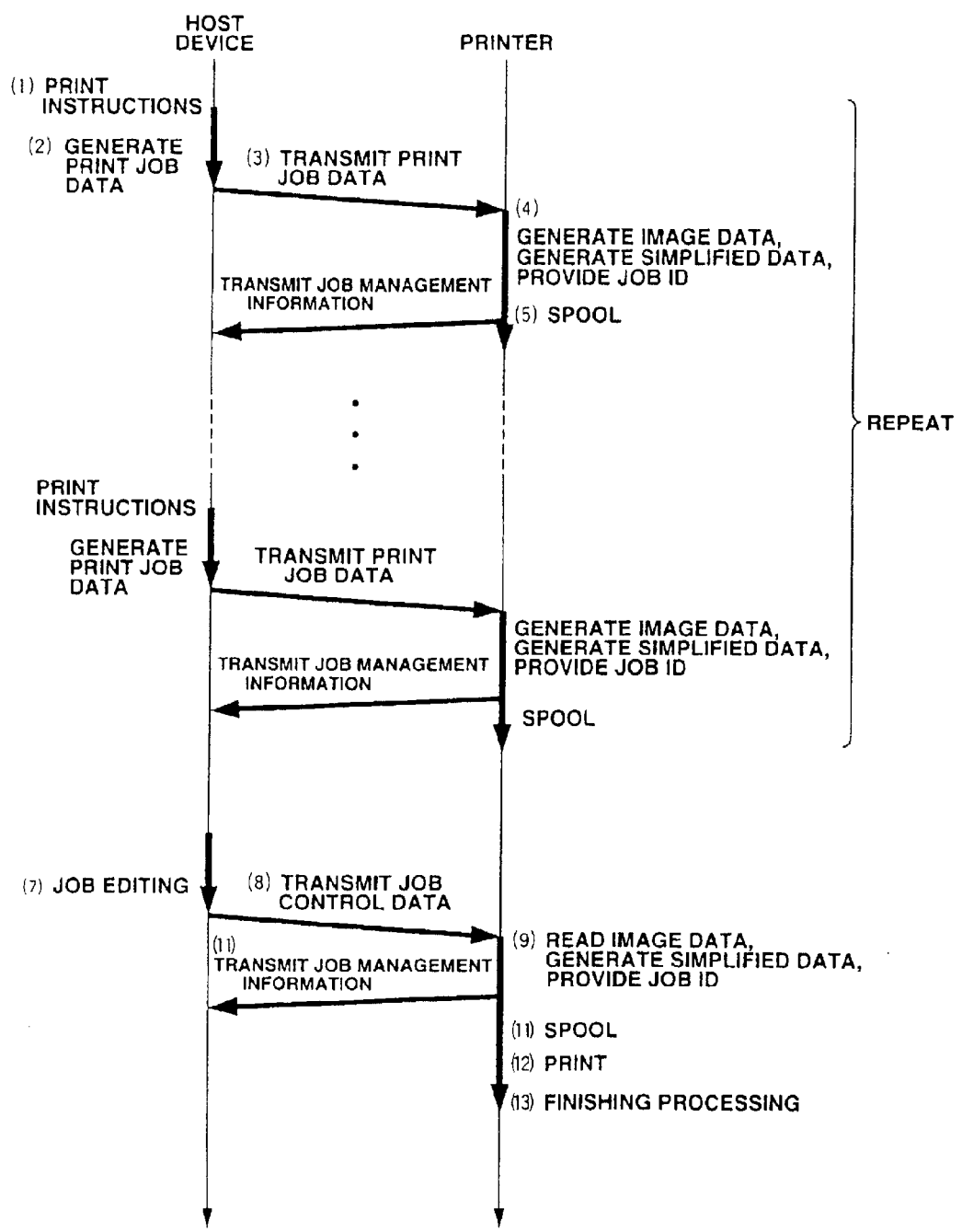
FIG. 19 is a diagram for explaining an operational example of the print system of Embodiment 2.

FIG. 19 is a diagram for explaining an operational example of the print system according to the present embodiment. Described below is an example of collectively printing four types of documents; namely, "BUNSHO" prepared with word processor software, "GAZOU" prepared with graphics software, "HYOU" prepared with chart/calculation software, and "HYOUSHI" prepared with other graphics software. Foremost, when a job generation instruction is given by a user from the first application program 102 (FIG. 15; (1)), the printer driver 103 generates print job data (FIG. 15; (2)), and transmits this to the printer 2 (FIG. 15; (3)). The printer 2 generates image data based on print job data, generates simplified data based on this image data, and thereafter provides the same ID number to the generated image data and simplified data (FIG. 15; (4)). The printer 2 stores the image data and simplified data in the image spool unit 111 (FIG. 15; (5)) and sends the simplified data (job management data) given a job ID to the host device 1 (FIG. 15; (6)). Thereby, the job management data to the first print job data is spooled and stored. The user repeats the aforementioned processing as necessary. Next, when job-editing instructions are provided from the user, for example, the print utility program 105 of the host device 1 displays a job-editing window and accepts job-editing operations (FIG. 15; (7)). When job editing is completed, the print utility program 105 transmits the edited contents to the printer 2 as job control data (FIG. 15; (8)). When the printer 2 receives the job control data, it generates simplified data by reading the image data in accordance with the contents thereof, and similarly provides a job ID thereto (FIG. 15; (9)) The printer 2 stores the image data read in accordance with the job control data in the image spool unit 111 (FIG. 15; (10)), and stores the simplified data given a job ID in the image spool unit 111 as well (FIG. 15; (11)). The printer 2 supplies the read image data to the print engine 114, executes printing (FIG. 15; (12)) and, when finishing processing is designated, performs finishing processing (FIG. 15; (13)).

Moreover, since the functions of other units are the same as Embodiment 1, the explanation thereof is omitted.

According to this embodiment as described above, it is possible to easily obtain a single bound document based on a plurality of application data. Further, in this embodiment, jobs are temporarily stored as image data in the printer, such job management data is transmitted to the host device, and the jobs are operated on the host device side. As the jobs are exchanged in formats of job IDs and simplified data, the communication load may be reduced. Particularly, upon sending job control data from the host device to the printer, only a job ID needs to be transmitted and, therefore, the communication load may be reduced. [Embodiment 3]

In the aforementioned embodiment, the print job data sent from the printer driver 103 is temporarily spooled to the job spool unit 11 without being subject to the print processing. In this embodiment, however, as shown in FIG. 2(*b*), if the instantaneous printing of the print job data is not designated, the print job data is output to the job spool unit 111, developed to the image memory, and instantaneously printed.
[Embodiment 4]

In this embodiment, print job data and its related information sent from the host device is stored in a prescribed storage device. The printer thereby displays the related information on a prescribed display device, urges the user for instructions on the print job data and, in accordance with the instructions input by the user, successively reads the print job data stored in the prescribed storage device and conducts printing on the print recording medium.

The host device 1 stores a plurality of application data (document data of documents, diagrams, charts, etc.) prepared and edited by the user upon execution of various application software. Here, the host device 1 stores application data having a file name of "WORD" prepared using word processor software, a file name of "CELL" prepared using chart/calculation software, a file name of "DRAW" prepared using diagram data, and a file name of "PRESENT" prepared using presentation data.

Explained below is the case where each of the aforementioned application data is printed with a printer as collective material.

Figure 20:
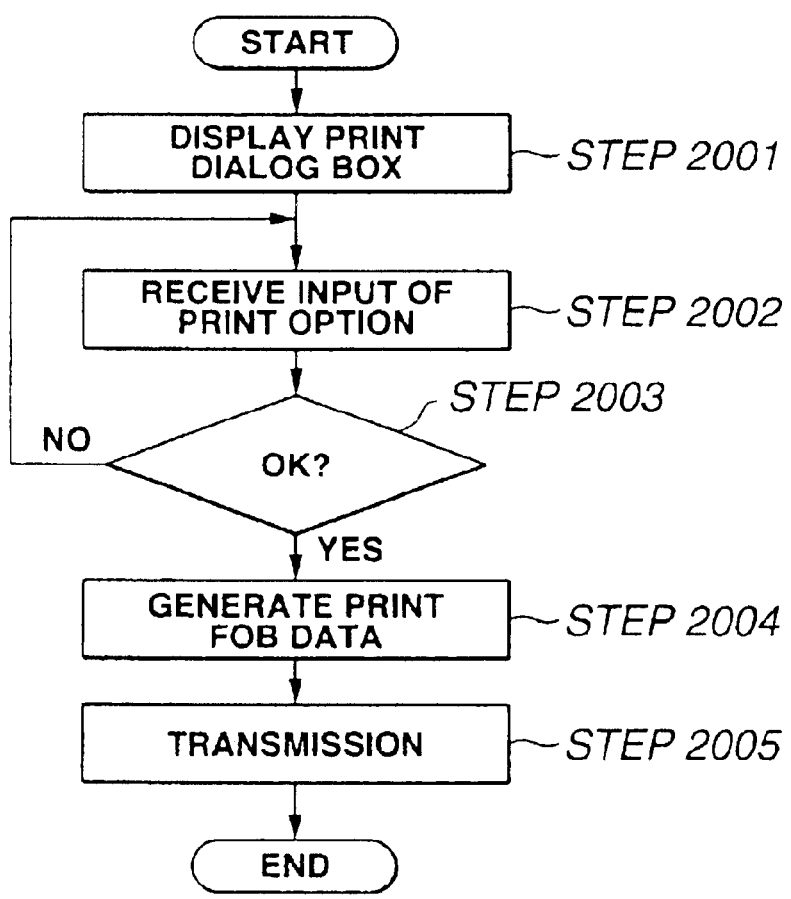
FIG. 20 is a flowchart for explaining the operational processing of the printer driver of Embodiment 4.
Figure 21:
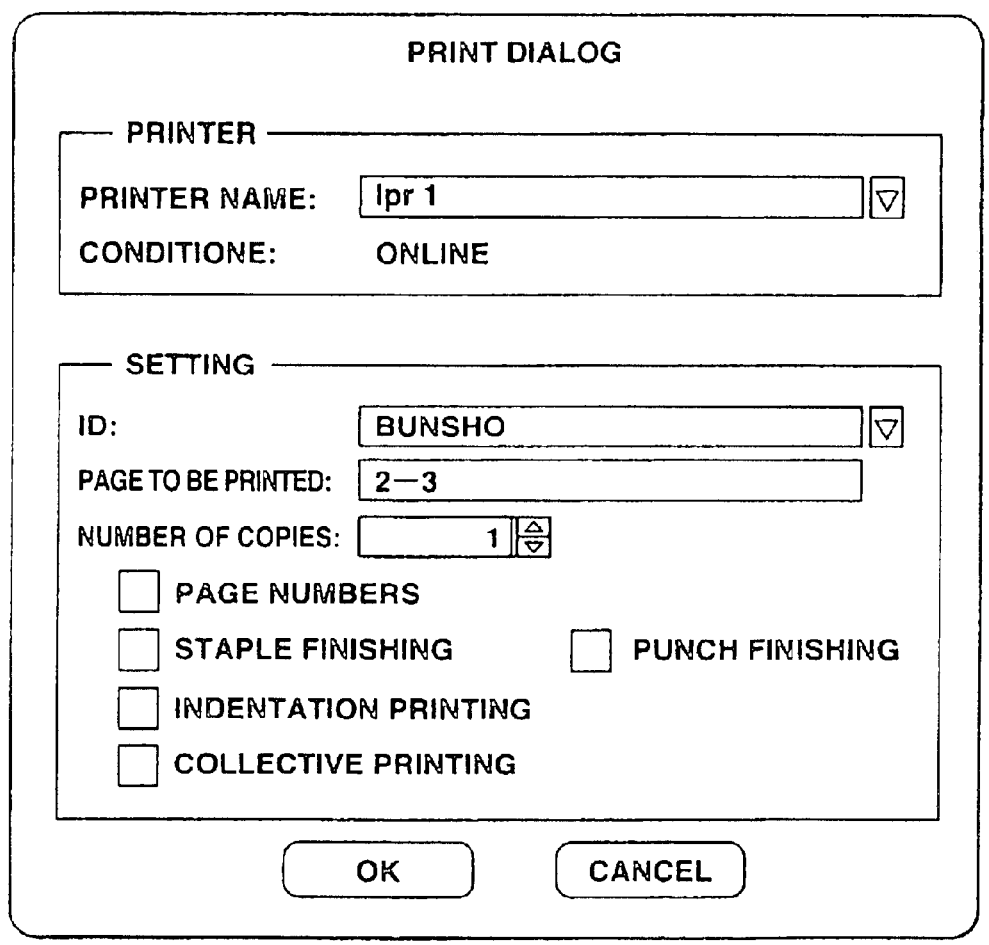
FIG. 21 is a diagram showing an example of a GUI screen of the print dialog of Embodiment 4.

FIG. 20 is a diagram for explaining the operation processing of the printer driver on the host device 1. In FIG. 20, upon receiving printing instructions from the respective application programs, the printer driver displays a print dialog box (STEP 2001), and accepts the input of information (print option) relating to the print setting (STEP 2002). FIG. 21 is a diagram showing an example of the GUI screen of the print dialog according to the present embodiment. The user is able to input prescribed information pursuant to the user interface functions of the host device 1. For example, let it be assumed that pages 2~3 of the application data called "WORD," which is 5 pages long, are to be printed. In FIG. 21, an ID is a unique name given by the user upon providing print instructions, and a name capable of identifying the respective application data with the printer 2 will suffice. Pages "2~3", are input to the column for designating the range of printing. The range of printing, for example, is designated in page units. Further, when desiring to conduct printing collectively with other materials, the user checks the "collective printing" checkbox. Thereby, it is possible to notify the printer 2 that the application data is subject to collective printing. This print dialog may also be structured to have finishing processing such as "staple" or "punch" as well as to accept the input of "page numbers" and "number of copies" and so on.

Referring back to FIG. 20, upon receiving an OK instruction via the GUI screen of the print dialog box (STEP 2003), the printer driver generates print job data based on application data and print setting information input via the GUI screen (STEP 2004). Print job data, for example, is printer control language to be interpreted by the printer 2. When the printer driver generates print job data, it transmits this to the printer 2 via the network interface (STEP 2005).

Figure 22:
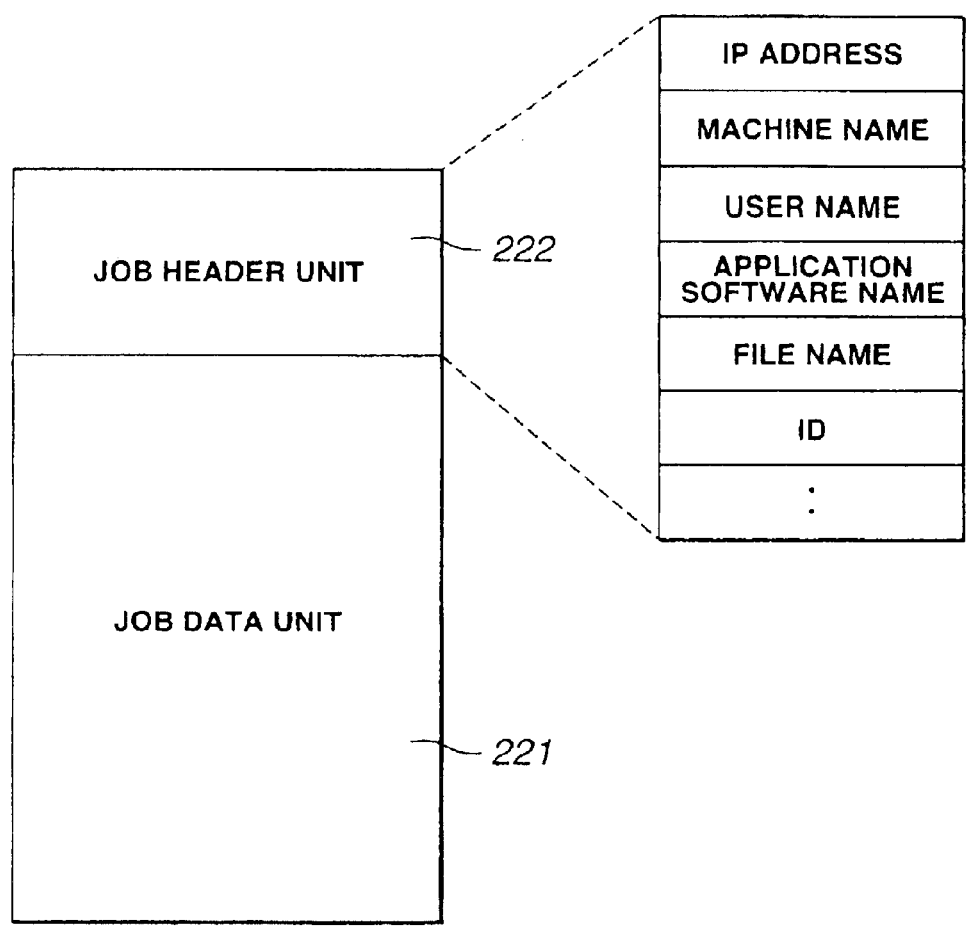
FIG. 22 is a diagram showing the contents of the print data of Embodiment 4.

FIG. 22 is a diagram showing the contents of the print data generated with the printer driver. This print job data is structured of a print job data section 221 and print job header section 222.

The print job data section 221 contains command codes based on the application data to be actually printed and the print setting information. Print setting information, for example, reflects the input information and contains information related to the existence of collective printing, staples, etc.

The print job header section 222 contains information related to the print job data section 221. The print job header section 222 is structured from the likes of ID information on the network of the host device which made the request of print jobs (e.g., IP address), machine name on the network, user name, application software name used for preparing data, file name, ID, and so on.

Contents of the print data are not limited to those illustrated in FIG. 22, and may include information on the existence of collective printing, staples, etc. as a part of the print job header section.

Moreover, although the print job header section 222 and print job data section 221 are shown in a succession in FIG. 22, they may be structured to be independent data, respectively, and separately transmitted.

Next, the operational processing of the printer 2 is explained. The printer 2 typically comprises a control device equipped with a processor, ROM or RAM, and performs prescribed processing by the processor interpreting programs stored in the ROM.

Figure 23:
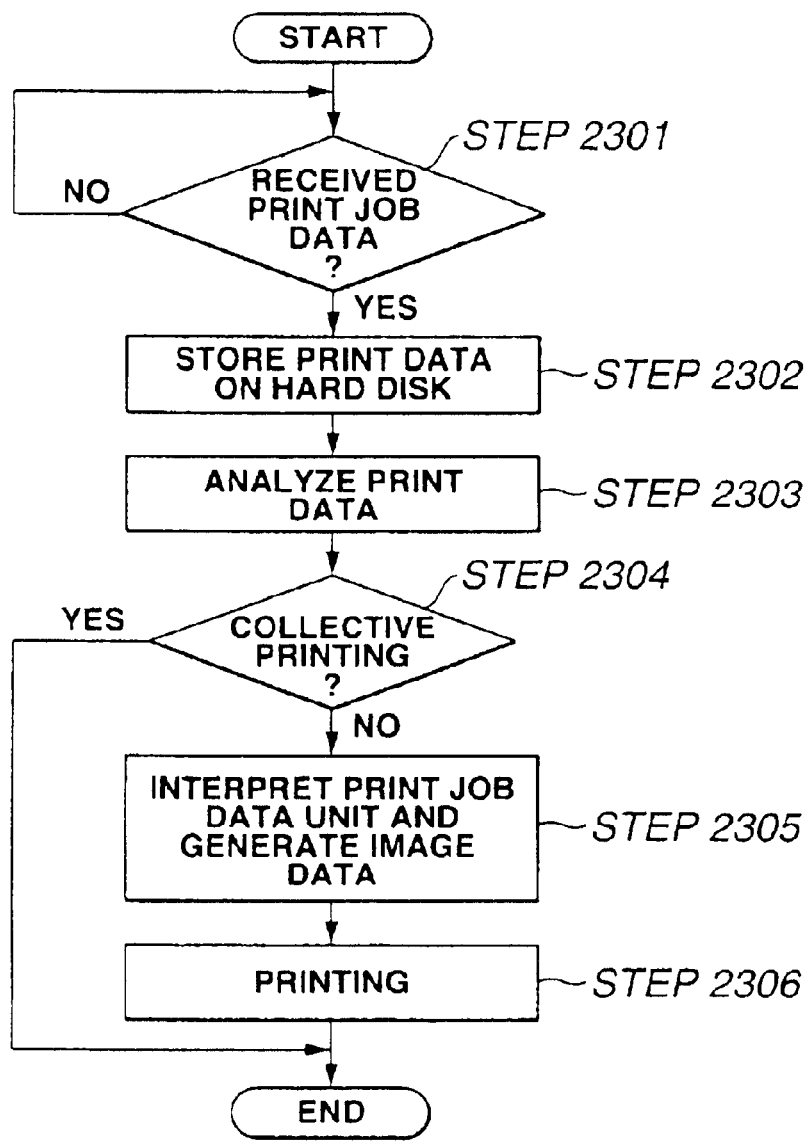
FIG. 23 is a flowchart for explaining the operational processing of the printer of Embodiment 4.

FIG. 23 is a diagram for explaining the operational processing of the printer 2. Upon receiving the print data (STEP 2301), the printer 2 temporarily stores this in a storage device such as a built-in hard disk (STEP 2302). The storage device manages each print job data separately.

The printer 2 analyzes the received print job data (STEP 2303) and judges whether collecting printing has been instructed (STEP 2304). At STEP 2304, ordinary printing is conducted when it is judged that collective printing has not been instructed. In other words, the printer 2 generates image data in a bitmap format based on the print job data section (STEP 2305), and realizes printing by supplying this to the print engine (STEP 2306).

Meanwhile, at STEP 2304, if it is judged that instructions for collective printing have been given, the printer 2 temporarily suspends processing until the user inputs instruction information via the user interface unit provided on the printer 2.

Figure 24:
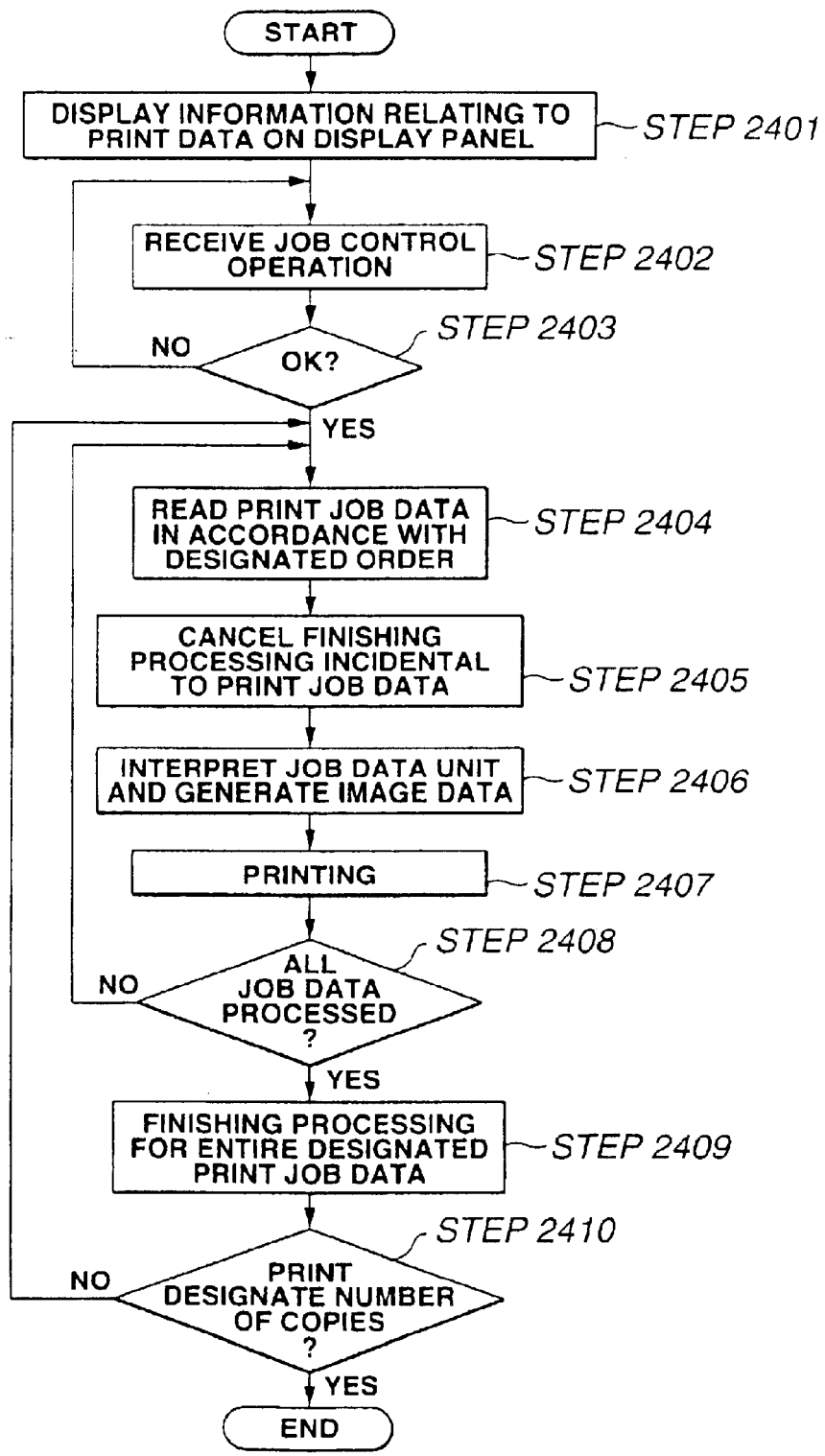
FIG. 24 is a flowchart for explaining the operational processing of the printer of Embodiment 4.
Figure 25:
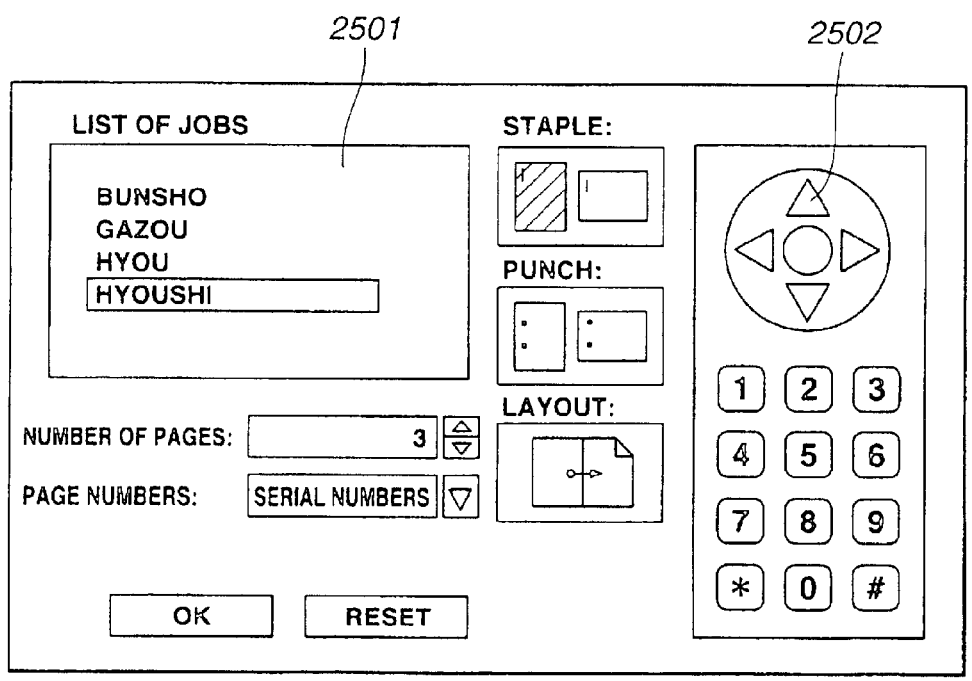
FIG. 25 is a diagram showing the interface screen of the printer of Embodiment 4.

FIG. 24 is a diagram for explaining the operational processing of the printer when collective printing is designated. When instructions are given by the user for displaying a screen of collective printing from the menu screen via the user interface unit, the printer 2 displays on the user interface unit information related to the print data previously stored on the hard disk (STEP 2401). The printer 2 accepts input of job control operations (instructive information) of the user in response to the information related to this print data (STEP 2402). FIG. 25 is a diagram showing an example of the user interface unit. This user interface unit, for example, is realized with a touch panel system. The job list area 71 shows a list of print job data (jobs) stored on the hard disk. This display needs to merely enable the user to distinguish the print job data. In this example, displayed is the ID input by the user via the host device. The user designates an arbitrary number of print data to be printed among the print data displayed on the job list area 71, and may further designate the printing order thereof. The designation of the print data to be printed, for example, is conducted by moving the cursor pointer shown as the shaded portion in the drawing with the cursor button 72, and pressing the confirmation button (#), and repeating such steps. The designation of the printing order is conducted by moving the cursor pointer with the cursor button 2502, selecting the print data in which the order is to be switched with the selection button (*), moving the cursor pointer once again with the cursor button 2502 to the desired position, and repeating such steps. For example, when "HYOUSHI" is selected, the cursor is moved to the uppermost row of the job list by selecting the up cursor button 2502 three times. Moreover, numeral keys may be used to directly input the ordinal numbers showing the printing order.

The section "number of copies" shows the number of copies the printed matter should be printed pursuant to the collective processing and, for example, numerical values are input with numeral keys. The section "page numbers" is for designating whether to add page numbers to the printed matter to be printed pursuant to the collective processing. It is possible to designate the addition of consecutive numbers per print data, or the addition of serial numbers to the final printed matter. The sections "staple" and "punch" imply the finishing processing, and is for designating the finishing processing to the printed matter obtained pursuant to the printing of the plurality of selected and printed print job data. Furthermore, the section "layout" is for designating how to assign the image data, which is based on the print data, to the print recording medium. For example, there are "2 UP" where 2 pages worth of data in the application software is assigned to one sheet of paper, and "½ UP" where one page worth of data in the application software is assigned to two sheets of paper.

In addition, by selecting "detailed processing," it is possible to designate further detailed settings for printing. For example, it is possible to designate the paper size per print job data.

After the printer 2 accepts the "OK" button (STEP 2403), it consecutively reads the print job data designated with the accepted job control (STEP 2404). The printer 2 invalidates the finishing processing such as staples and punches incidental to the individual print job data (STEP 2405) and, after generating the image data (STEP 2406), conducts printing on the print recording medium (STEP 2407). The printer 2 judges whether all print job data designated by the job control has been processed (STEP 2408), and when this judgment is no, it returns to the aforementioned STEP 2404. If the judgment of the printer 2 in STEP 2408 is yes, it conducts finishing processing to the overall print job data designated by the job control (STEP 2409). In other words, the finishing processing to be conducted to the overall print job data mentioned above refers to finishing processing such as stapling the printed matter obtained by printing the plurality of designated print job data. The printer 2 returns to STEP 2404 when the number of copies designated pursuant to the job control has not be printed, and repeats the aforementioned processing until such number of copies is reached (STEP 2410).

Next, explained is the control of collective printing upon receiving the following four types of print job data.

(1) Application data: document data

ID: BUNSHO

IP address of host device which prepared the data: 123.456.xxl

Machine name of host device which prepared the data: host device 001

User name: A

Application name: word processor software

File name: DOCUMENT

Pages to be printed: pages 2~3

Staple: no (2) Application data: image data

ID: GAZOU

IP address of host device which prepared the data: 123.456.xxl

Machine name of host device which prepared the data: host device 001

User name: A

Application name: drawing software

File name: DRAW

Pages to be printed: pages 6~9

Staple: no (3) Application data: chart/calculation data

ID: HYOU

IP address of host device which prepared the data: 123.456.xxl

Machine name of host device which prepared the data: host device 001

User name: A
Application name: chart/calculation software
File name: CELL
Pages to be printed: pages 1~5,
Staple: no (4) Application data: document data
ID: HYOUSHI
IP address of host device which prepared the data: 123.456.xxl
Machine name of host device which prepared the data: host device 001
User name: A
Application name: word processor software
File name: FRONT
Pages to be printed: page 1
Staple: yes Upon accepting these for print data in order, the interface screen of the printer 2 will be as shown in FIG. 25. Here, upon collectively printing these print job data by changing the order to (4), (1), (3), (2), the order of print data is changed with the cursor key or the like. According to these instructions, it is possible to collectively print the first page of the document data, pages 2~3 of the document data, pages 1~5 of the chart/calculation data, and pages 2~3 of the image data a total of ten pages of material.

Moreover, upon using a staple for the finishing, it is possible to collectively bind 10 pages of material, regardless of the staple setting of the respective application data, by selecting the finishing staple icon. It is further possible to decide the number of copies of the material to be printed by giving instructions of such number of copies with numeral keys or the like.

Here, although explained was the case where print job data is received from the same host device and same user, it is possible to prepare collective material based on print job data from different host devices or different users.

Furthermore, it is also possible to provide a function of partial trial printing for collective print data as the collective material. Here, when the user instructs trial printing, partial printing is conducted, and while confirming the print results, the user may additionally instruct the required number of copies.

Accordingly, by utilizing the printer of the present embodiment, it is possible to suitably change, on the printer side, the printing order, number of copies to be printed, staple setting, etc. conventionally decided by the user upon the preparation of the document after the making the request of the control job.

Thus, according to this embodiment, it is possible to control the user's desires on printing with more versatility as print job data can be received on the printer side and, pursuant thereto, the printing order, number of copies of collective printing, staple setting, etc. may be controlled by the printer.

The aforementioned respective embodiments are for exemplifying the examples of the present invention, and are not intended to limit the scope of this invention to such embodiments. So as long as the gist hereof is not deviated, the present invention may be worked in various forms and manners.

What I claim is:

1. A printer having a communication interface unit connectable to a host device via a network, comprising:

a job type determination unit for judging a type of a print job data sent from said host device;

an image generating unit for generating a print data based on an ordinary print job data if said type of said print job data is judged to be said ordinary print job data;

a job control unit for issuing ID information to identify said print data;

a storage unit, under controlling said job control unit, for storing said print data associated with said ID information; and a print engine for printing on a print recording medium based on said print data;

wherein said job control unit reads said print data from said storage unit in accordance with said ID information of second print job data sent from said host device if said type of said second print job data is judged to be job control data.

2. A printer according to claim 1, wherein said job determination unit sends said print job data to said job control unit if the job determination unit determines that said print job data is job control data, and sends said print job data to said image generating unit if the job determination unit determines that said print job data is ordinary print job data.

3. A printer according to claim 1, further comprising means for controlling said print engine, wherein, when said second print job data contains prescribed bookbinding designative information related to finishing processing, said means controls said print engine so as to perform finishing processing based on said prescribed bookbinding designative information.

4. A printer according to claim 1, further comprising simplified data generation means for generating simplified data based on said print job data, wherein said job control unit associates said ID information with said simplified data, and sends the simplified data associated with said ID information as job management information to said host device.

5. A printer according to claim 1, wherein said job control unit associates newly issued ID information with said read print data.

* * * * *